United States Patent
Morton et al.

(10) Patent No.: US 6,938,099 B2
(45) Date of Patent: Aug. 30, 2005

(54) COMMUNICATION SYSTEM WITH WIRELESS ELECTRONIC MAIL OR MESSAGING INTEGRATED AND/OR ASSOCIATED WITH APPLICATION PROGRAM RESIDING ON REMOTE COMPUTING DEVICE

(75) Inventors: James W. Morton, Charlotte, NC (US); William T. Brown, Celine, OH (US)

(73) Assignee: Motient Communications Inc., Lincolnshire, IL (US)

( * ) Notice: Subject to any disclaimer, the term of this patent is extended or adjusted under 35 U.S.C. 154(b) by 569 days.

(21) Appl. No.: 09/917,937

(22) Filed: Jul. 31, 2001

(65) Prior Publication Data

US 2002/0032018 A1 Mar. 14, 2002

Related U.S. Application Data

(60) Provisional application No. 60/222,036, filed on Jul. 31, 2000.

(51) Int. Cl.[7] .............................................. G06F 15/16
(52) U.S. Cl. ....................... 709/246; 709/206; 709/225; 709/226; 709/227; 709/229
(58) Field of Search ................................. 709/206, 225, 709/226, 227, 229, 246

(56) References Cited

U.S. PATENT DOCUMENTS

| 5,933,478 | A | | 8/1999 | Ozaki et al. |
| 6,029,143 | A | * | 2/2000 | Mosher et al. ................. 705/28 |
| 6,088,340 | A | * | 7/2000 | Buchholz et al. ........... 370/310 |
| 6,219,694 | B1 | | 4/2001 | Lazaridis et al. |
| 6,393,408 | B1 | * | 5/2002 | Mosher et al. ................. 705/28 |
| 6,397,259 | B1 | * | 5/2002 | Lincke et al. ................ 709/236 |
| 6,415,156 | B1 | * | 7/2002 | Stadelmann ................. 455/466 |
| 6,633,900 | B1 | * | 10/2003 | Khalessi et al. ............ 709/202 |
| 6,694,366 | B1 | * | 2/2004 | Gernert et al. .............. 709/227 |

\* cited by examiner

*Primary Examiner*—Saleh Najjar
(74) *Attorney, Agent, or Firm*—Irah H. Donner; Wilmer Cutler Pickering Hale and Dorr LLP

(57) ABSTRACT

A wireless communications system is provided that enables a user to send data pertaining to the shipment and/or delivery of goods, preferably from a handheld device, to at least one data file associated with at least one respective application program residing on a remote computing device. The application program rapidly receives the sent data and integrates the data into at least one data file associated therewith, thereby enabling more timely and efficient business operations. In a preferred embodiment, user input is minimized by using a macro feature, and users can input data fields in any order without affecting the performance or reliability of the system.

21 Claims, 13 Drawing Sheets

AUTO TEXT TIPS

| IF YOU WANT TO: | TYPE: |
|---|---|
| ENTER AN OPEN ANGLE BRACKET | br + SPACE |
| ENTER THE CURRENT DATE | ld + SPACE |
| ENTER THE CURRENT TIME | lt + SPACE |
| ENTER A CLOSE ANGLE BRACKET | rb + SPACE |

FIG. 5

COMMUNICATION SYSTEM WITH WIRELESS ELECTRONIC MAIL OR MESSAGING INTEGRATED AND/OR ASSOCIATED WITH APPLICATION PROGRAM RESIDING ON REMOTE COMPUTING DEVICE

RELATED APPLICATIONS

This application claims priority from U.S. Provisional Application Ser. No. 60/222,036, filed on Jul. 31, 2000, entitled "Communication System with Wireless Electronic Mail Integrated and/or Associated with Application Program on Remote Computing Device", incorporated herein by reference.

BACKGROUND OF THE INVENTION

1. Field of the Invention

The present invention generally relates to wireless communications and, more particularly, to a wireless communications system that enables a user to send data pertaining to the shipment and/or delivery of goods via a wireless transmission to, for example, a delivery system having at least one data file or data format associated with at least one application program residing on a remote computing device.

2. Background of the Related Art

Mobile communications are a widely used throughout the world for remote communication. E-mails and phone calls can be initiated and received on current mobile communication devices. The present invention applies various features to the trucking/shipping industry where remote personnel may communicate information with a remote computer. This allows information to be transferred more efficiently and quickly than existing methods.

Currently, wireless transmission of e-mails is known. FIG. 1 is a diagram showing the outline of the whole structure of an automatic data transfer system illustrated in U.S. Pat. No. 5,933,478 incorporated herein by reference. In FIG. 1 number 150 represents a handheld terminal device, numeral 118 represents a host computer for the communication with the handheld terminal device, and numeral 120 represent a public telephone line. In addition numeral 130 represents a base station for transmitting a message to the handheld terminal device 150 over radio waves, and numeral 140 represents a handheld phone base station for the communication with the handheld terminal device 150, over radio waves.

Host computer 118 transmits a message to handheld terminal device 150 via the base station 130. This message contains an identifier of a file to be fetched by the handheld terminal device 150. Upon reception of the message, the handheld terminal device 150 performs data communications with the host computer 118 by using a handheld phone function thereof, and fetches the file (or electronic mail) designated by the message.

A flow diagram of an Automatic Character Format routine is shown in FIG. 2, from U.S. Pat. No. 5,621,875 incorporated herein by reference. The Automatic Character Format routine operates in the automatic formatting mode to automatically apply the selected character format to any number of portions of existing text thereafter selected by the user. The selected character format is so applied until the user exits the automatic formatting mode or enters new text from a keyboard. The Automatic Character Format routine is called by the word processing program and by the Text Entry routine. Whenever the Automatic Character Format routine is called, the word processing system converts to automatic formatting mode, if not already operating therein.

In step 900, the Automatic Character Format routine sets the selected character format to be automatically applied to the text selected by the user. The routine sets the character format by storing a status string as an identifier identifying the selected character format in the format status field 302 of the text format data structure 300. For example, if a bold character format has been selected by the user, then the status string "ON" is stored in the format status field corresponding to the format option field containing the string "BOLD". In step 901, the Automatic Character Format routine indicates that a character format has been set to be automatically applied. The routine indicates this by displaying the selection cursor in a form specific to character selection. When a paragraph format is selected instead of, or in addition to, a character format, the selection cursor 212 is instead displayed in a form specific to paragraph selection.

Alternatively, the selection cursor contains a format indication area, and indicates the specifically selected character format by displaying an appropriate symbol in the format indication area. This symbol could be a character, such as "I" for italics, or an icon, a color, etc., as screen space and resolution permits. In the alternative embodiment wherein multiple text formats are selected, the multiple character formats would be indicated with multiple symbols in the format indication area of the text selection cursor, also as screen space and resolution permits. The format symbol remains displayed in the format indication area for as long as the selected text format remains selected to be automatically applied in the automatic formatting mode.

In step 902, the routine determines whether an additional character format has been selected by the user. If so, control branches to step 903, wherein the Automatic Character Format routine is again called to apply the additional character format. If not, control proceeds to step 904, wherein the routine determines whether a paragraph format has been selected by the user. If so, control branches to step 905, wherein the Automatic Paragraph Format routine is called to additionally apply the paragraph format selected. If not, control proceeds to step 906. After performing either the Automatic Character Format or the Automatic Paragraph Format routine, the routine returns.

In step 606, the Automatic Character Format routine determines whether the cancel button, has been selected by the user to cancel the selected character format. If so, the routine branches to step 907 wherein the status strings in the format status fields are removed and the word processing system converts to the conventional mode. The routine then returns. If the Automatic Character Format routine determines in step 906 that the user has not selected the cancel button, then control proceeds to step 906. The routine determines in step 906 whether the user has selected a key on the keyboard to enter new text. If so, control branches to step 609 wherein the routine removes the status strings stored in the format status fields 302 of the text format data structure. Control then proceeds to step 910 wherein the Text Entry routine, is called and the word processing system converts to the conventional mode. The Text Entry routine enters the text into the text document, as has been explained. The Automatic Character Format routine then returns.

If the Automatic Character Format routine determines in step 906 that a key has not been selected, then control proceeds to step 912 wherein the routine determines whether the user has initiated a text selection indicating a portion of text to which to apply the character format selected in the automatic formatting mode.

The user initiates a text selection by moving the mouse 120 to position the text selection cursor 912 on a word displayed on the display, and then depressing the mouse button on the mouse while the text selection cursor is so positioned. If the user has not initiated a text selection, then the routine loops back to step 906 and continues to check for user input in steps 906, 908 and 912. If the Automatic Character Format routine determines in step 912 that the user has initiated a text selection, then control proceeds to step 914. In step 914, the routine determines whether the user has clicked the mouse on a single word or dragged the mouse across multiple words. The user clicks the mouse on a single word by releasing the depressed mouse button while the text selection cursor is positioned anywhere on the displayed word. The user drags the mouse across multiple words by holding the mouse button down and moving the mouse to move the cursor from anywhere on the first word initially selected to a position anywhere on a last word to be selected.

If, in step 914, the Automatic Character Format routine determines that the user has clicked on a word, then control proceeds to step 916. In step 916, the routine reads the text format data structure, and formats each character in the word clicked on to have the text formats indicated in the format status fields as selected by the user. The formatting of a given character or set of characters is a conventional operation well-known to those skilled in the art. An insertion point which defines the location and format of characters thereafter typed is also formatted to have the character format selected. The routine then loops back to step 606 to continue to check for user input. Thereafter, text entered in step 908 also has the selected character format.

If the routine determines that the user has dragged the mouse across multiple words, control branches to step 918 wherein the routine formats each character in each of the multiple words, from the first to last word selected, to have the text formats indicated in the format status fields as selected by the user. The insertion point is also formatted to have the character format selected. The routine then loops back to step 606 to continue to check for user input. If the user neither clicks nor drags the mouse in step 914, control loops to step 902, and the routine continues to check for user input.

Mobile communications systems are known in the art for providing a communications link between a user of a mobile communications device (e.g., a handheld device) and a stationary base or mobile vehicle. Mobile communication devices can be linked via a network to provide greater range and/or service. One such network is the ARDIS® network ("network") 100 in FIG. 3. Networks of this nature provide secure, portable, two-way communication between handheld wireless data terminals, mobile data terminals, and their respective host computers.

As shown in FIG. 3, the network 100 is a terrestrial wireless two-way data network that allows subscriber units such as an intelligent terminal or computing device 102, handheld device 104, or other communications device 106 to communicate with their respective host computer 108 and each other without a phone line connection. Subscriber units 102, 104, 106, therefore, typically have a radio frequency (RF) modem for sending and receiving signals.

The network 100 has over 1750 base stations 110 providing service to cities and towns throughout the United States, Puerto Rico, and U.S. Virgin Islands. Each base station 110 covers a radius of approximately 15–20 miles. The base stations 110 are radio frequency towers that transmit or receive radio signals between subscriber units 102, 104, 106 and the Radio Frequency/Network Control Processors (RF/NCPs) 112. Base stations 110 transmit and receive radio signals, preferably using a narrow band FM transceiver operating in the 800 MHz frequency band. There are separate frequencies for the transmit path and the receive path; together these two frequencies represent a full duplex channel that normally transmits data at 4800 bps in both directions. In operation, for a message "inbound" to the network 100 from a subscriber unit 102, 104, 106, the signal is "heard" by the base stations 110 and sent over a phone line 116 to a RF/NCP 112. The network 100 employs an automated roaming capability that allows the free movement of subscriber units 102, 104, 106 between cities and between multiple channels within a given city. This capability allows the subscriber units 102, 104, 106 to freely move (roam) across the country and take advantage of all the network 100 services that are available in every locale.

The RF/NCPs 112 are high-speed computers that interconnect multiple base stations 110 with the ARDIS® Service Engine(s) (ASEs) 114. A number of RF/NCPs 112 are located together serving a particular geographical area, each being connected by high speed digital phone service to one of the ASEs 114, which route messages to a destination such as a customer host computer 108 that is directly connected to the network 100 by, for example, a leased telephone line or a value added network. RF/NCPs 112 pass information relating to source, destination and length of each message to an ASE 114 that enables the network 100 to do network analysis of traffic density in, for example, each city. An ASE 114, in turn, passes information back to a RF/NCP 112 concerning whether the subscriber unit 102, 104, 106 is properly registered to the network 100 and, if so, what level of service is provided to the respective subscriber unit 102, 104, 106. The RF/NCPs also help manage the roaming capability of the network 100. Subscriber units 102, 104, 106 can automatically move (roam) between any of the network 100 frequencies on either of the two protocols (MDC 4800 and RD-LAP19.2), or between any of the configured network 100 layers that have been configured for in-building or on-street usage.

The ACEs 114 are general purpose computers that act as the heart of the network 100. The ACEs 114 route messages to the proper destination, store subscribe registration information including entitlement, and perform accounting and billing functions. The ACEs 114 also serve as a point of connectivity to customer host computers 108, perform protocol conversion, and perform network 100 troubleshooting and test functions. A plurality of ASEs 114 are interconnected through dedicated leased lines, with alternate paths available from each switch as a contingency measure against line interruptions.

The wireline network 116 provides communication between the customer host computers 108, the ACEs 114, the RF/NCPs 112, and the base stations 110. The wireline network 116 is equipped with sophisticated communications equipment that relays customer messages. This equipment includes intelligent multiplexers, leased telephone circuits, high-speed modems or digital service units, and modems for both RF/NCP 112 and customer host computer 108 connectivity.

Presently, however, within the transportation industry, we have determined that communications systems are not utilized and/or designed to transmit data pertaining to, for example, the shipment and/or delivery of goods to a data file, associated with or via an application program residing on a remote computing device that facilitates entry of data. A need exists, therefore, for an integrated mobile communications system that enables a user to send data pertaining to the shipment and/or delivery of goods via a wireless transmission to, for example, a destination or file associated with or via an application program residing on a remote computing device. The present invention fulfills this need by providing such a system and method of operation thereof that facilitates entry of data and/or assists the user of the mobile device and/or facilitates the transmission of the data throughout the communication system.

SUMMARY OF THE INVENTION

It is a feature and advantage of the present invention to provide a mobile communications device that transmits data pertaining to the shipment and/or delivery of goods to a data file or other destination associated with or via an application program residing on a remote computing device and/or the mobile communications device.

It is a further feature and advantage of the present invention to enable users to transmit data pertaining to the shipment and/or delivery of goods to a remote computing device while minimizing keystrokes and ensuring data consistency.

It is another feature and advantage of the present invention to provide a system and method in which the sequence in which data fields are transmitted by a data transmission device to the remote computing device optionally in a sequence independent manner, thereby facilitating ease of use.

It is yet another feature and advantage of the present invention to enable expedition of order conformation, shipment confirmation, receipt confirmation and/or billing processes in the transportation industry.

It is still another feature and advantage of the present invention to enable shipping and/or cargo capacity of a delivery vehicle to optionally be more closely matched with the quantity and/or volume of goods to be shipped.

It is still another feature and advantage of the present invention to enable off-the-shelf equipment to be used to transmit via a wireless network data pertaining to the delivery of goods that is used by a data file optionally associated with an application program residing on a remote computing device.

It is still another feature and advantage of the present invention to enable the sender of data pertaining to the delivery of goods to optionally receive a return acknowledgment when the transmitted data is processed.

An additional feature and advantage of the present invention is to enable users to integrate data pertaining to the shipment and/or delivery of goods, as desired.

The integrated mobile communications system of the present invention is economical, durable, and easy-to-use. The system is also flexible in that it permits changes with regard to definition of the data fields associated with transmitted data to be instituted typically by users of the system without any significant or any software modification, thereby precluding the need for routine input or assistance from an outside source. It is particularly well-suited to applications in the transportation industry that involve the delivery of goods, since the mobile communications device minimizes typing requirements in regard to the shipment and/or delivery of such goods.

To achieve these features and advantages, a communication system is provided that transmits data pertaining to the shipment and/or delivery of goods via a wireless transmission to a remote computing device, wherein the data is standardized and integrated into a data file or other format included or associated with an application program residing on the remote computing device. The application program can be for example, a payroll system, a billing system, and the like.

In accordance with the present invention, the system comprises a data transmission device, preferably mobile, that uses an autotext feature (e.g., macros, objects or other programming techniques) to standardize user entries and minimize user keystrokes. The data transmission device is used to transmit data to a data file or other format included or associated with an application program residing on a remote computing device, while conforming with cost and function constraints.

Specifically, an exemplary embodiment of the present invention includes a handheld data transmission device that sends data via a wireless transmission to a remote computing device. The transmitted data is integrated with a data file or standardized with respect to a predetermined format associated with an application program residing on the remote device. The present invention thus provides a system and method that integrates transmitted data pertaining to delivered goods into a data file or format associated with an application program residing on a remote device such as a computer, as opposed to merely transmitting non-standardized data via, say, an e-mail message.

It is also preferred that the data transmission device contain pre-loaded, standard terms for the autotext entries (i.e., customized vocabulary), but also allow end-users to enter their own customized vocabulary on a limited optionally pre-approved basis. The autotext capability, as will be explained in further detail herein, enables users in a very simple way to enter information that a computer on the other end can reliably understand or parse on a prespecified basis. Users can enter autotext entries directly into the data transmission device itself, or advantageously download their customized vocabulary to the data transmission device.

The invention thus enables data to be entered and transmitted to a remote computing device in a consistent, cost efficient manner, with minimal programming or customization on the transmission device (e.g., eLink or other system).

In a preferred embodiment, a gateway is provided that integrates, formats or prepares the transmitted data into a data file or other format, message and the like associated with an application program residing on a remote computing device such as a general purpose computer. It should thus be understood that the invention does not merely transmit data via, say, an e-mail message. Rather, the gateway is used to integrate that data with a data file or message associated with an application program residing on the remote computing device. The remote computing device could be a standard personal computer running in, say a Microsoft Windows or an NT environment. Alternately, the remote computing device could equally be a standard minicomputer or mainframe computer.

The gateway receives the messages from, for example, a network such as the Internet, or a relay line, and transfers data contained in the messages to a data file associated with an application program residing on the remote computing device. At least a portion of the data fields of a data file associated with the application program residing on the remote device are populated with at least a portion of the transmitted data. In a preferred embodiment, the gateway parses the data, thereby facilitating population of the data fields of the application program.

It is preferred that the gateway reside on the remote computing device, and comprise a parser that receives the formatted data sent from a data transmission device that, as previously discussed, provides for data consistency. To facilitate parsing, it is preferred that the transmitted data have a delimiter or other similar marking device or system placed on either side of the data associated with each transmitted data field. The delimiter can optionally be any character the user wants.

Further, the invention provides a standardized, preset autotext vocabulary, as well as the ability for users to customize autotext entries so they can build their own vocabularies by either a manual or automated process. The process can be automated, for example, by installing software that provides this functionality. The autotext feature minimizes user keystrokes, standardizes data format, and allows users to send data associated with data fields in any order desired. Thus, for example, a user could type in bl, which the autotext feature would expand to bill of lading, and then type in wgt, which the autotext feature would then expand to weight. Alternately, the user could input wgt and then bl, each of which again would be expanded by the autotext feature. The gateway detects what sequence the fields come in, "grabs" the data in a standardized manner, and moves it to the proper location (e.g., data file).

It is preferred that user-entered text data is automatically converted to all upper case letters to achieve data consistency. Alternatively, all lower case letters could equally be used, or any combination of upper and lower case letters. The invention also advantageously simplifies the entry of numeric data. In many data transmission devices, a function key or a similar key must be depressed by the user when numeric data is being entered. The present invention eliminates the need for this by utilizing the name of the fields in which the numeric data is to be entered. For example, in the case of the wgt field, the autotext feature of the present invention knows that numeric data must be entered, thus relieving the user of having to depress, for example, a function key or similar key when entering numeric data. The present invention facilitates or enables a driver to use the data transmission device by facilitating ease of data entry by, for example, minimizing typing requirements, and using abbreviations. Therefore, human to computer interaction is facilitated by the use of this autotext feature.

The features and advantages of the present invention will be realized by considering the following conditions particular to the trucking industry. In a trucking environment, if a company wants to start its billing process, one of two things must typically be done. The company can wait until a driver returns from making a delivery and manually submit his billing information to the billing department (or other designated department in accordance with company operations), after which time the billing department enters the data into the billing system. Secondly, the driver can call and verbally give the information to, say, a dispatcher, who subsequently enters it into a computer system. Both of these ways are time consuming and/or tend to occur late in the day. In addition, we have determined that these methods have resulted in various data formats that has created much confusion, and time-consuming efforts in utilizing data entered by drivers or field personnel.

With the present invention, data can be provided in more timely fashion, and in a consistent format. A driver can thus transmit the data immediately after a delivery at, say, 1:00 PM and have the data integrated into the data fields of the application program associated with or residing on a remote computing device shortly thereafter instead of having to wait for the data to be entered when the driver returns at, say, 5:00 PM. The invention thus would provide, for example, a four hour head start in the billing process.

The present invention thus facilitates advance planning, so that the logistical aspects of matching up trucking (i.e., shipping/cargo) capacity for a given shipment to a given destination at a given time can be better accomplished. This advantage will be realized by the data transfer system of the present invention that ensures data consistency built around communications and, enhanced or modified autotext features.

In accordance with the present invention, the wireless communication system includes a portable data transmission device. The device allows the user to enter data into a predefined data field. Each predefined data field corresponds to a user defined representation of a word or phrase. The predefined data field and the data associated with the format are defined using a standard format. Connected to the transmission device is a remote computing device which receives the predefined data field and associated data. The remote computing device process the received data using an application program stored on the remote computing device. The standard format is defined so the application program is able to receive the data. The transmission device and remote computer are connected to a network. The network transmits the data from the transmission device to the remote computing device.

The standard format comprises a bill of lading, a weight, a shipper zip, a consignee zip, a number of pieces shipped, a delivery date, a name of an individual who signed a delivery receipt, a product number, an indication that the goods are delivered, an indication that the goods are picked up, an estimated time of arrival, a comment, an indication that a trailer is being dropped off, an indication that a trailer is being picked up, a drop/hook indication, and an indication that the goods are at least one of over, short and damaged.

The remote computing device verifies the user has entered a valid predefined data field prior to transmission. The remote computing device verifies that data received is valid and complete prior to using the transmitted data.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure as embodying features of the invention will be best understood when read in reference to the accompanying figures wherein:

FIG. 5 is a flow diagram illustrating a preferred method of the invention;

DETAILED DESCRIPTION OF A PREFERRED EMBODIMENT OF THE INVENTION

Figure 1:
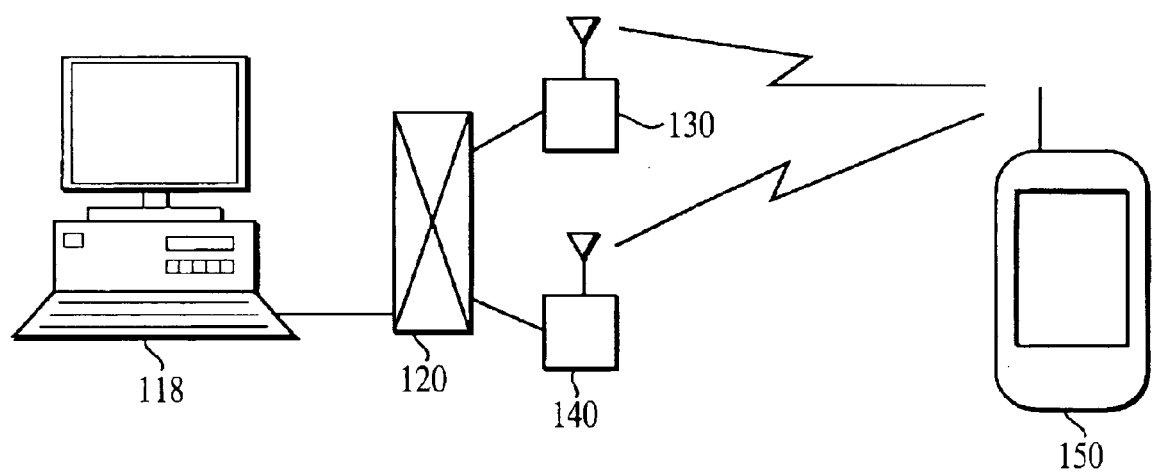
FIG. 1 is a schematically simplified representation of the ARDIS® network.
Figure 2:
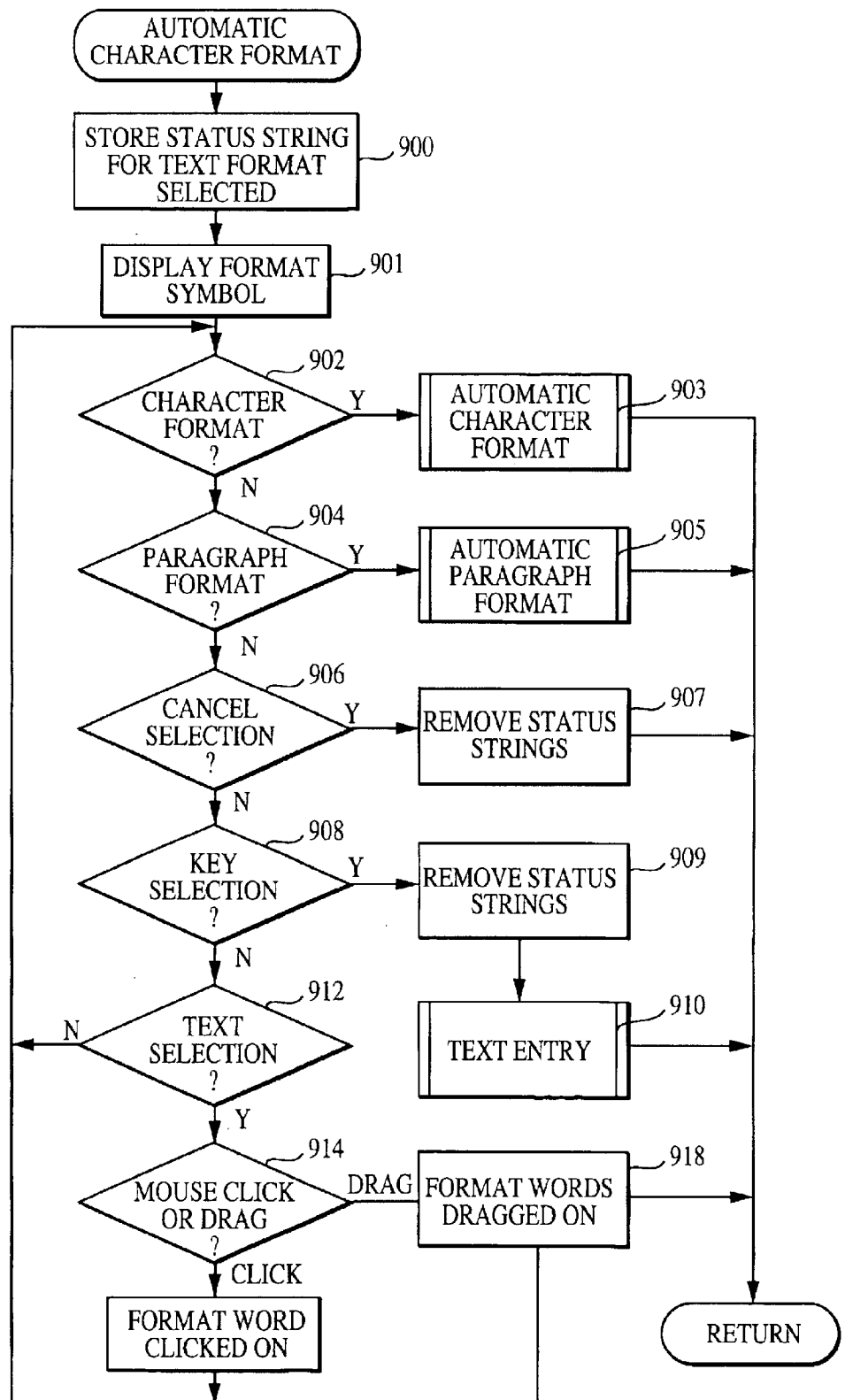
FIG. 2 is a diagram showing the outline of the whole structure of an automatic data transfer system of handheld device.
Figure 3:
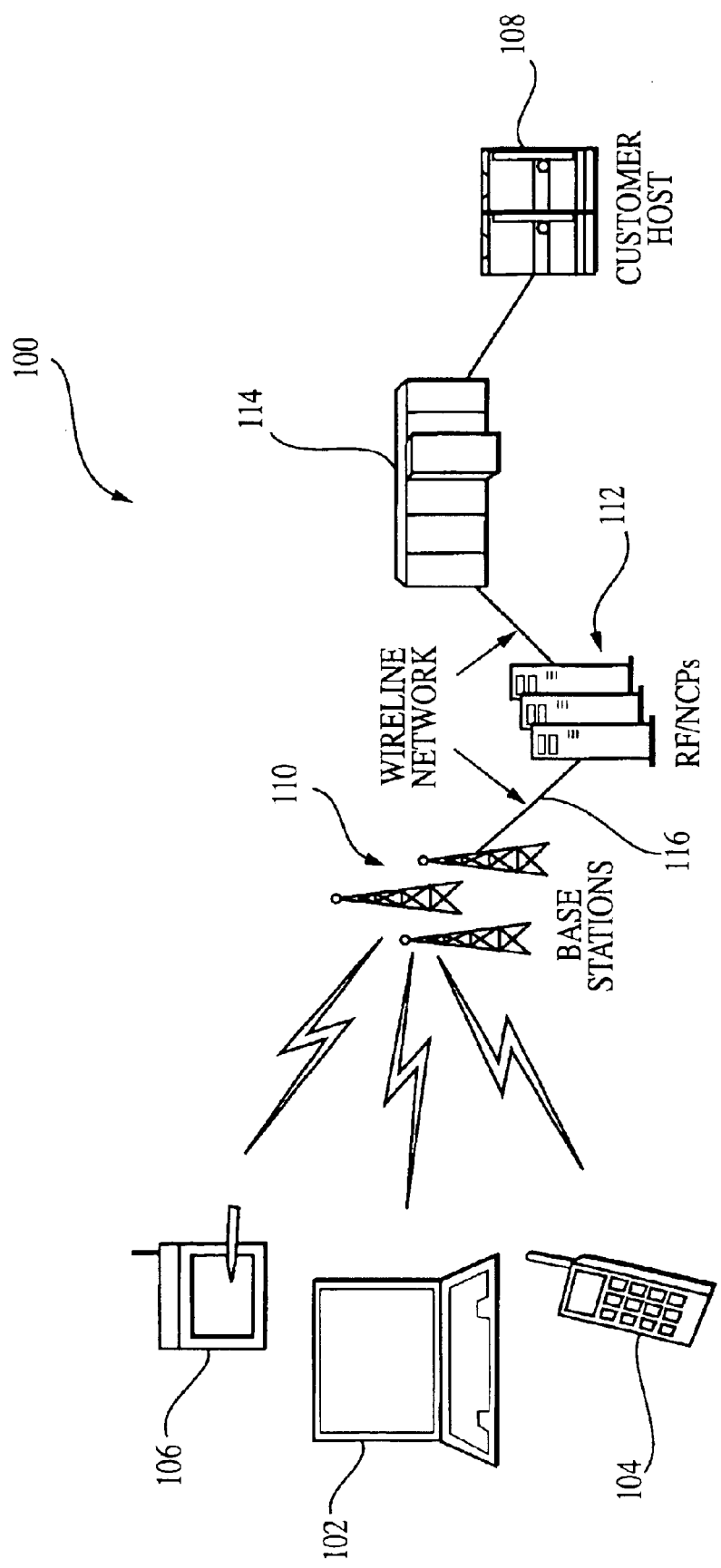
FIG. 3 is a flow diagram of a Text Entry routing procedure.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The integrated mobile communications system of the present invention is economical, durable, and easy-to-use. The system is also flexible in that it permits changes with regard to definition of the data fields associated with transmitted data to be instituted typically by users of the system without any significant or any software modification, thereby precluding the need for routine input or assistance from an outside source. It is particularly well-suited to applications in the transportation industry that involve the delivery of goods, since the mobile communications device minimizes typing requirements in regard to the shipment and/or delivery of such goods.

To achieve these features and advantages, a communication system is provided that transmits data pertaining to the shipment and/or delivery of goods via a wireless transmission to a remote computing device, wherein the data is standardized and integrated into a data file or other format included or associated with an application program residing on the remote computing device. The application program can be for example, a payroll system, a billing system, and the like.

In accordance with the present invention, the system comprises a data transmission device, preferably mobile, that uses an autotext feature (e.g., macros, objects or other programming techniques) to standardize user entries and minimize user keystrokes. The data transmission device is used to transmit data to a data file or other format included or associated with an application program residing on a remote computing device, while conforming with cost and function constraints.

Specifically, an exemplary embodiment of the present invention includes a handheld data transmission device that sends data via a wireless transmission to a remote computing device. The transmitted data is integrated with a data file or standardized with respect to a predetermined format associated with an application program residing on the remote device. The present invention thus provides a system and method that integrates transmitted data pertaining to delivered goods into a data file or format associated with an application program residing on a remote device such as a computer, as opposed to merely transmitting non-standardized data via, say, an e-mail message.

It is also preferred that the data transmission device contain pre-loaded, standard terms for the autotext entries (i.e., customized vocabulary), but also allow end-users to enter their own customized vocabulary on a limited optionally pre-approved basis. The autotext capability, as will be explained in further detail herein, enables users in a very simple way to enter information that a computer on the other end can reliably understand or parse on a prespecified basis. Users can enter autotext entries directly into the data transmission device itself, or advantageously download their customized vocabulary to the data transmission device.

The invention thus enables data to be entered and transmitted to a remote computing device in a consistent, cost efficient manner, with minimal programming or customization on the transmission device (e.g., eLink or other system).

In a preferred embodiment, a gateway is provided that integrates, formats or prepares the transmitted data into a data file or other format, message and the like associated with an application program residing on a remote computing device such as a general purpose computer. It should thus be understood that the invention does not merely transmit data via, say, an e-mail message. Rather, the gateway is used to integrate that data with a data file or message associated with an application program residing on the remote computing device. The remote computing device could be a standard personal computer running in, say a Microsoft Windows or an NT environment. Alternately, the remote computing device could equally be a standard minicomputer or mainframe computer.

The gateway receives the messages from, for example, a network such as the Internet, or a relay line, and transfers data contained in the messages to a data file associated with an application program residing on the remote computing device. At least a portion of the data fields of a data file associated with the application program residing on the remote device are populated with at least a portion of the transmitted data. In a preferred embodiment, the gateway parses the data, thereby facilitating population of the data fields of the application program.

It is preferred that the gateway reside on the remote computing device, and comprise a parser that receives the formatted data sent from a data transmission device that, as previously discussed, provides for data consistency. To facilitate parsing, it is preferred that the transmitted data have a delimiter or other similar marking device or system placed on either side of the data associated with each transmitted data field. The delimiter can optionally be any character the user wants.

Further, the invention provides a standardized, preset autotext vocabulary, as well as the ability for users to customize autotext entries so they can build their own vocabularies by either a manual or automated process. The process can be automated, for example, by installing software that provides this functionality. The autotext feature minimizes user keystrokes, standardizes data format, and allows users to send data associated with data fields in any order desired. Thus, for example, a user could type in bl, which the autotext feature would expand to bill of lading, and then type in wgt, which the autotext feature would then expand to weight. Alternately, the user could input wgt and then bl, each of which again would be expanded by the autotext feature. The gateway detects what sequence the fields come in, "grabs" the data in a standardized manner, and moves it to the proper location (e.g., data file).

It is preferred that user-entered text data is automatically converted to all upper case letters to achieve data consistency. Alternatively, all lower case letters could equally be used, or any combination of upper and lower case letters. The invention also advantageously simplifies the entry of numeric data. In many data transmission devices, a function key or a similar key must be depressed by the user when numeric data is being entered. The present invention eliminates the need for this by utilizing the name of the fields in which the numeric data is to be entered. For example, in the case of the wgt field, the autotext feature of the present invention knows that numeric data must be entered, thus relieving the user of having to depress, for example, a function key or similar key when entering numeric data. The present invention facilitates or enables a driver to use the data transmission device by facilitating ease of data entry by, for example, minimizing typing requirements, and using abbreviations. Therefore, human to computer interaction is facilitated by the use of this autotext feature.

The features and advantages of the present invention will be realized by considering the following conditions particular to the trucking industry. In a trucking environment, if a company wants to start its billing process, one of two things must typically be done. The company can wait until a driver returns from making a delivery and manually submit his billing information to the billing department (or other designated department in accordance with company operations), after which time the billing department enters the data into the billing system. Secondly, the driver can call and verbally give the information to, say, a dispatcher, who subsequently enters it into a computer system. Both of these ways are time consuming and/or tend to occur late in the day. In addition, we have determined that these methods have resulted in various data formats that has created much confusion, and time-consuming efforts in utilizing data entered by drivers or field personnel.

With the present invention, data can be provided in more timely fashion, and in a consistent format. A driver can thus transmit the data immediately after a delivery at, say, 1:00 PM and have the data integrated into the data fields of the application program associated with or residing on a remote computing device shortly thereafter instead of having to wait for the data to be entered when the driver returns at, say, 5:00 PM. The invention thus would provide, for example, a four hour head start in the billing process.

The present invention thus facilitates advance planning, so that the logistical aspects of matching up trucking (i.e., shipping/cargo) capacity for a given shipment to a given destination at a given time can be better accomplished. This advantage will be realized by the data transfer system of the present invention that ensures data consistency built around communications and, enhanced or modified autotext features.

Figure 4:
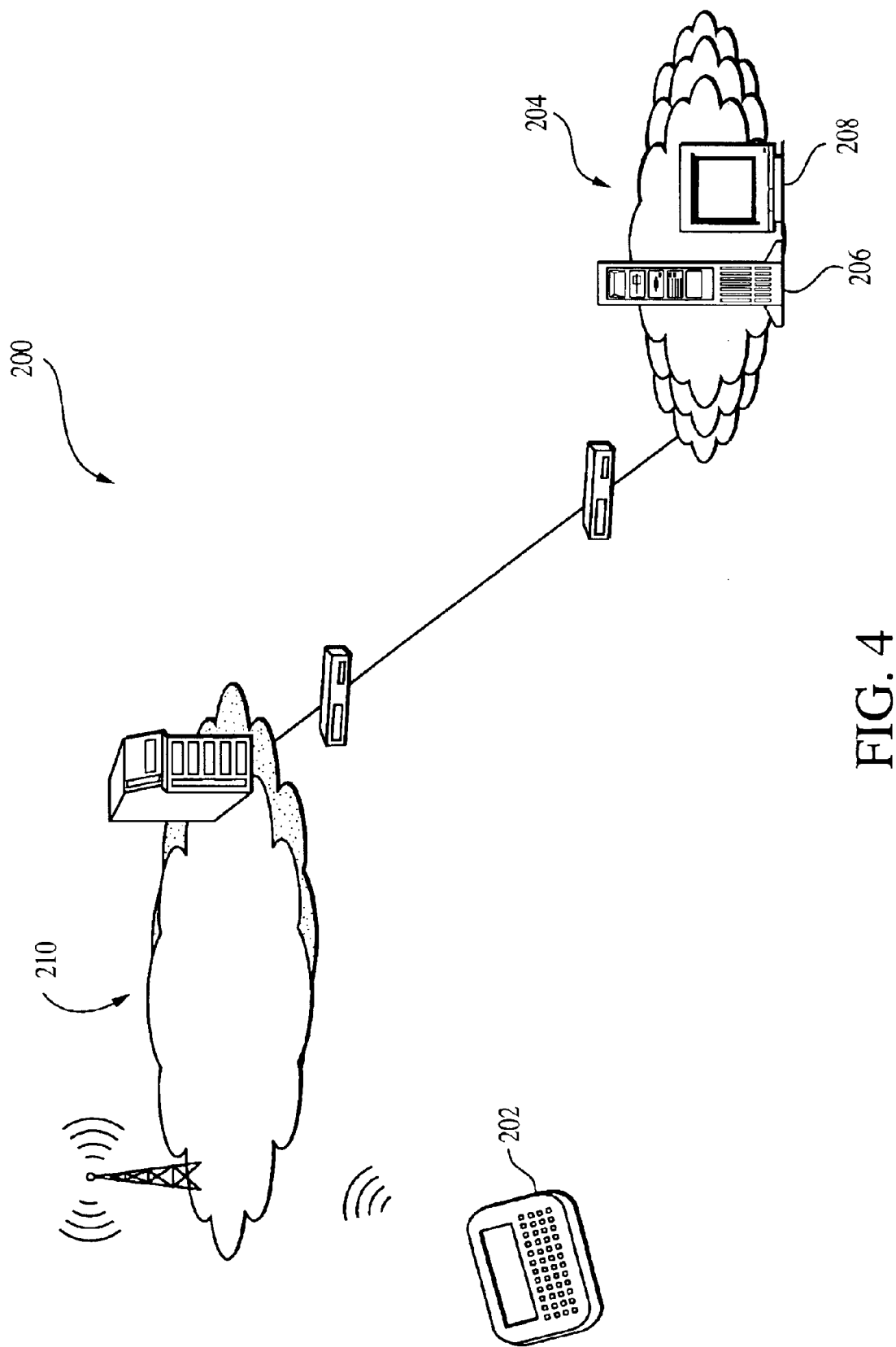
FIG. 4 is a schematically simplified representation of a communications system according to the present invention.

Referring to FIG. 4, communication system 200 enables a data transmission device 202 to send, via a wireless transmission, data pertaining to delivered goods to a remote computing device 204, while conforming with cost and function constraints. 6. The data transmission device 202 verifies that the user has entered a valid predefined data field prior to transmission. The data received by the remote computing device 206 is subsequently integrated into a data file or other method of storage associated with an application program residing on the remote computing device 206. The remote computing device 204, verifies that a valid data field has been received prior to utilizing the transmitted data. In a preferred embodiment, the communication system 200 uses a standard autotext feature (e.g., macros, objects or other programming techniques) that minimizes user input requirements and communicates with a second network or remote computing device 206. It should be understood, however, that the term data as used in the present application is not limited to ASCII data, but may also include facsimile data, video data, digital data, text data, graphical data, and the like.

The present invention can be best understood by the illustrative transportation/trucking industry example described below. However, it should be evident that the present invention can be equally well used in the context of other industries and/or applications wherein field personnel or remote personnel that utilize wireless devices are required to enter data confirming or describing their activities.

A preferred embodiment of the communication system 200 according to the present invention is shown in FIG. 4. A data transmission device 202 is provided that transfers data, preferably via an e-mail message, to a remote computing system 204 comprising a computing device 206 and a visual display such as a monitor 208. The remote computing device 206 can be any suitable general purpose computer, including mainframe computers, as well as minicomputers or microcomputers. The data flows from the data transmission device 202 through a network 210 to a receiver address, which is accessed by the remote computing device 206. At least a portion of the network 210 is wireless. The remote computing device 206 generally has running thereon application software (e.g., billing software, route planning software, inventory management software, flow management software, and the like), in addition to the application software that receives the e-mail and associated data transmitted by the data transmission device 202. The remote computing device 206 retrieves data sent by the data transmission device 202, and will typically store the data on, for example, a disk file (not shown) on the remote computing device 206. It is preferred that the data received is parsed, and utilized by a data file associated with an application program residing on the remote computing device 206, as will be described in further detail herein.

The data transmission device 202 may be, for example, a device such as the standard Research In Motion (RIM) 850 Wireless Handheld™ Device, which features a keypad (similar to a PC keyboard) for composing messages, and also allows users to scroll through messages and menu options without touching a key. It is preferred that the data transmission device 202 has an autotext feature to minimize keystrokes and thus facilitate ease of use, as will be discussed herein.

For purposes of this working example, the following autotext entries are defined. It is preferred that the data transmission device 202 have stored therein a plurality of predefined autotext entries that are readily available to the user. It is also preferred that the data transmission device provide the user the capability to define his own autotext entries in a manner that does not require any third party involvement.

Below is a listing of the significant or important set of information used in the present invention in connection with the shipping embodiment of the present invention:

| | |
|---|---|
| bl = :BILL OF LADING: | wgt = :WEIGHT: |
| shp = :SHIPPER ZIP: | cns = :CONSIGNEE ZIP: |
| pcs = :PIECES: | dt = :DATE: |
| sgn = :SIGNED BY: | pro = :PRO NUMBER: |
| del = :DELIVERY: | pu = :PICKUP: |
| eta = :ETA: | cmt = :COMMENT: |
| d = :DROP TRLR: | dh = :DROP/HOOK: |
| h = :HOOK TRLR: | osd = :OVER, SHORT OR DAMAGED: |

The autotext feature is used to create a delimited vocabulary specific, for example, to the transportation industry (e.g., the trucking industry). In the above example, a colon character (":"), is wrapped in front of and behind the expanded key words as is thus used as the delimiting character. As noted above, the delimiter may also be defined by the user.

Several different transmission devices are available that would allow for the communication from remote personnel to a remote computing device communicating the data relating to the pickup and delivery of goods. FIG. 5 is a table showing some examples of autotext tips on one such transmission device, i.e., the RIM 850 pager, incorporated herein by reference.

In a preferred embodiment, the subject line of an e-mail sent by a driver is used as a key to determine the type of e-mail being sent. For example, if the driver types pu in the subject line (automatically expanded by autotext to PICKUP), the communication system 200 knows, based on receipt of the subject field and indexing the subject field to predetermined processes and/or predetermined expectations of receiving certain data in a predetermined format, to search for information relative to a pickup. Similarly, del (expanded by autotext to DELIVERY) would indicate a delivery, and osd would be OVER, SHORT OR DAMAGED. The autotext feature of the invention, therefore, allows end users to select the information transmitted as well as reduce the number of keystrokes while entering data, and significantly in a standardized format.

Once the delimited autotext entries are created, they are utilized with a suitable e-mail or transmission system (such as the Motient Corp. eLink$^{SM}$ system) while in the "compose an e-mail" function so that the e-mail content (data message) is created with very few keystrokes. The autotext feature automatically expands the entries so that they have consistent spelling, and ensures that that appropriate data is typed into fields (e.g., that numeric characters are typed into numeric fields, and that text characters are typed into text fields, the number of characters, minimum/maximum, format of the characters, etc.). In a preferred embodiment, the autotext feature also converts all lower case characters into upper case characters (or vice-versa) within alpha-numeric fields, and ensures that all required fields are present before the data is transmitted by the data transmission device 202.

It is also preferred that the communication system 200 be interoperable with a wide variety of proprietary systems. For example, in a preferred embodiment, the communication system 200 will advantageously recognize and execute instructions as directed by the IBM Corporation commands QRYDST, RCVDST SNDMSG, and SNDDST. It is also preferred that automatic acknowledgements for passed and/or failed messages be sent to the data transmission device 202.

In a preferred embodiment, remote computing device 206 is unconcerned about a specific field sequence. Therefore, the actual sequence of the fields within the text of the e-mail is irrelevant. A user, therefore, could key in bl for the bill of lading, then the pro number, followed by cmt for comments. Alternatively, the user could key that same information in any other desired sequence. In a preferred embodiment, a program runs on remote computer 206 and identifies what sequence the fields came, utilizes the data that is critical or required, and moves that data to the proper location, such as a data file associated with an application program running on the remote computing device 206.

Delivery Message Example

A user sends an e-mail, having typed del in the subject line, which is automatically expanded by autotext to read DELIVERY. In the body of the message, the user types the two characters bl, which is then automatically expanded by the autotext feature to :BILL OF LADING:. The user then types in the actual bill of lading, the format of which can be optionally verified in a number of ways described above, preferably with no spaces, and then types in pro, which is automatically expanded to :PRO NUMBER:. The user then types in the pro number assigned to this shipment, which also is optionally verified.

Thus, a user's typing required to report a delivery amounts to the following keystrokes, once he is on the subject line of an e-mail:

del bl 123456 pro 1-666543-3

Because the communication system 200 operates independent of the sequence in which data entries are made, the DELIVERY message can equally assume either of the following forms:

:BILL OF LADING: 123456 :PRO NUMBER: 1-666543-3

:PRO NUMBER: 1-666544-4 :BILL OF LADING: NB76555

In operation, when the communication system 200 locates, for example, the words :BILL OF LADING:, it knows that whatever follows those words, up until the next delimiter, is the actual bill of lading, intended to be processed in some further manner by at least one other application program residing on the remote computing device 206. With both the bill of lading and the pro number, an optional edit to confirm the driver made no typographical errors on a delivery record can be made.

Pickup Message Example

When a driver makes a pickup, he sends an e-mail with pu in the subject (which expands to PICKUP).

In the body, the driver types:

bl, which is automatically expanded to :BILL OF LADING:. The driver then types in the actual bill of lading, with no spaces;

pro, which is automatically expanded to :PRO NUMBER:. He/she then types in, for example, 1-666543-3.

wgt which is automatically expanded to :WEIGHT:. He/she then types in the actual shipment weight;

pcs which is automatically expanded to :PIECES:. He/she then types in the number of skids; and cns which is automatically expanded to :CONSIGNEE ZIP:. He/she then types in the consignee zip code.

Thus, a user's typing required to report a delivery, amounts to the following keystrokes, optionally verified, once he is on the subject line of an e-mail:

pu bl NB123456 pro 1-666543-3 wgt 2213 pcs 2 cns 45822

When this message is received by the remote computing device 206, it can be processed locally or, for example, auto-forwarded to, say, a dispatcher, using appropriate commands built-in to the remote computing device 206. The dispatcher would then be aware of a completed pickup or delivery, with no phone call from the driver.

When either the PICKUP or DELIVERY message is received at remote computing device 206, the messages can be read for each of the required fields, and a response can automatically be sent back to the user. The message could, for example, indicate that all information was received or, in the alternative, indicate what information was missing.

Since each user-defined field has delimiters associated therewith, the contents of the field can be advantageously readily parsed for subsequent integration with one or more application programs residing on the remote computing device 206. In a preferred embodiment, a data queue will receive the data from the e-mail application program residing on computing device 206. The data queue will subsequently transmit the data in the data queue and place it in the appropriate fields of at least one data file associated with at least one respective application program residing on the remote computing device 206.

Figure 6:
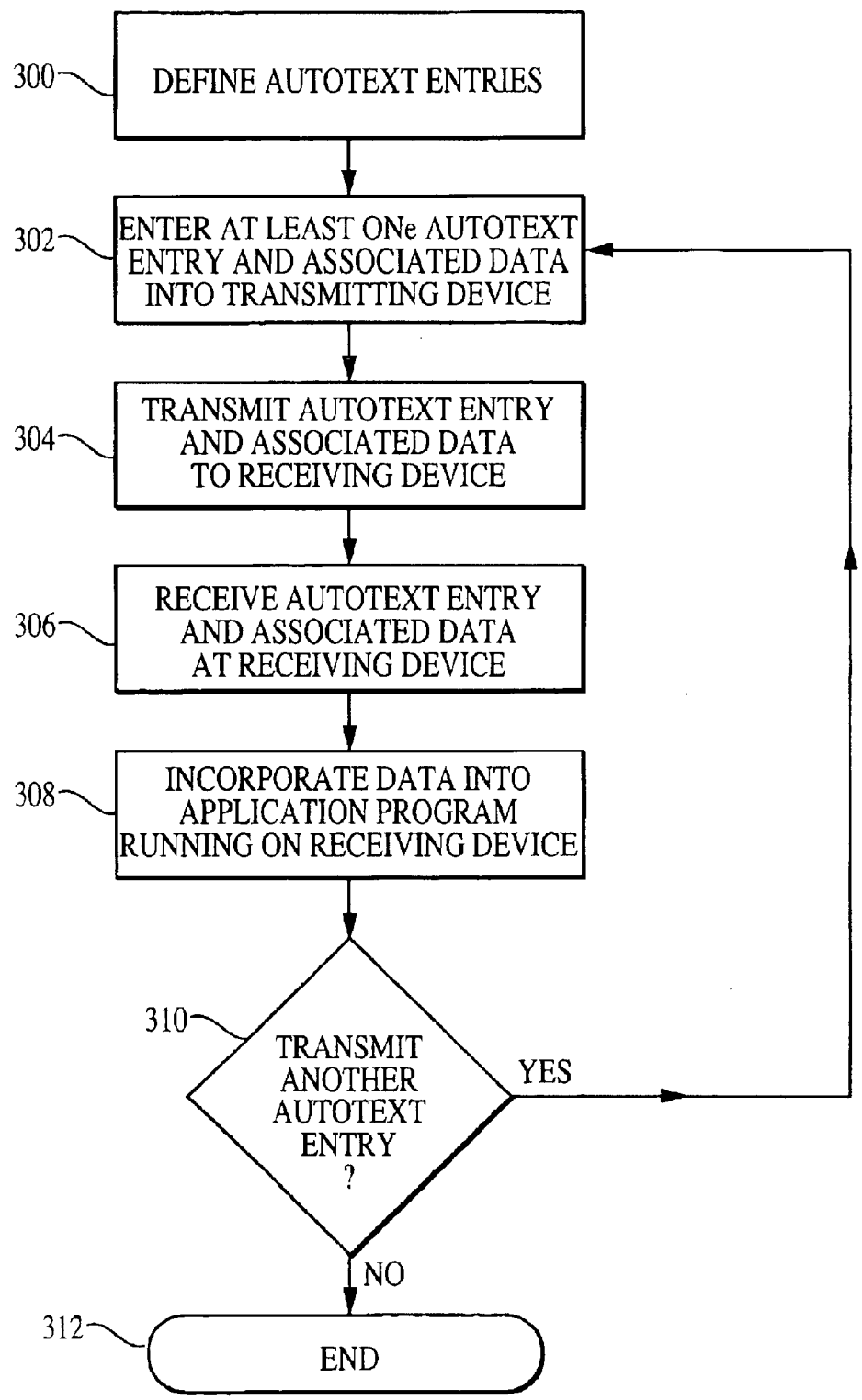
FIG. 6 is a flow diagram of the process to transmit data pertaining to the shipment of goods.

Turning now to FIG. 6, the steps of the process of one embodiment of the invention are shown. In step 300, autotext entries are defined. As previously stated, the autotext entries can be predefined by the software resident on the data transmission device 202, or can be defined by the user. In step 302, the user enters at least one autotext entry and associated data into the data transmission device 202. In step 304, the user transmits the autotext entry and associated data to a receiving device such as the remote computing device 206. As discussed above, the receiving device has application software residing thereon, and has, for example, at least one data file or predetermined format associated with the application software. In step 306, the autotext entry and associated data is received by the receiving device and, in step 308, the data is incorporated into at least one data file or format associated with the application program running on the receiving device. In step 310, the user makes a decision as to whether he wishes to transmit another autotext entry and associated data. If yes, the user returns to step 302; if no, the process terminates, as indicated at step 312.

Figure 7:
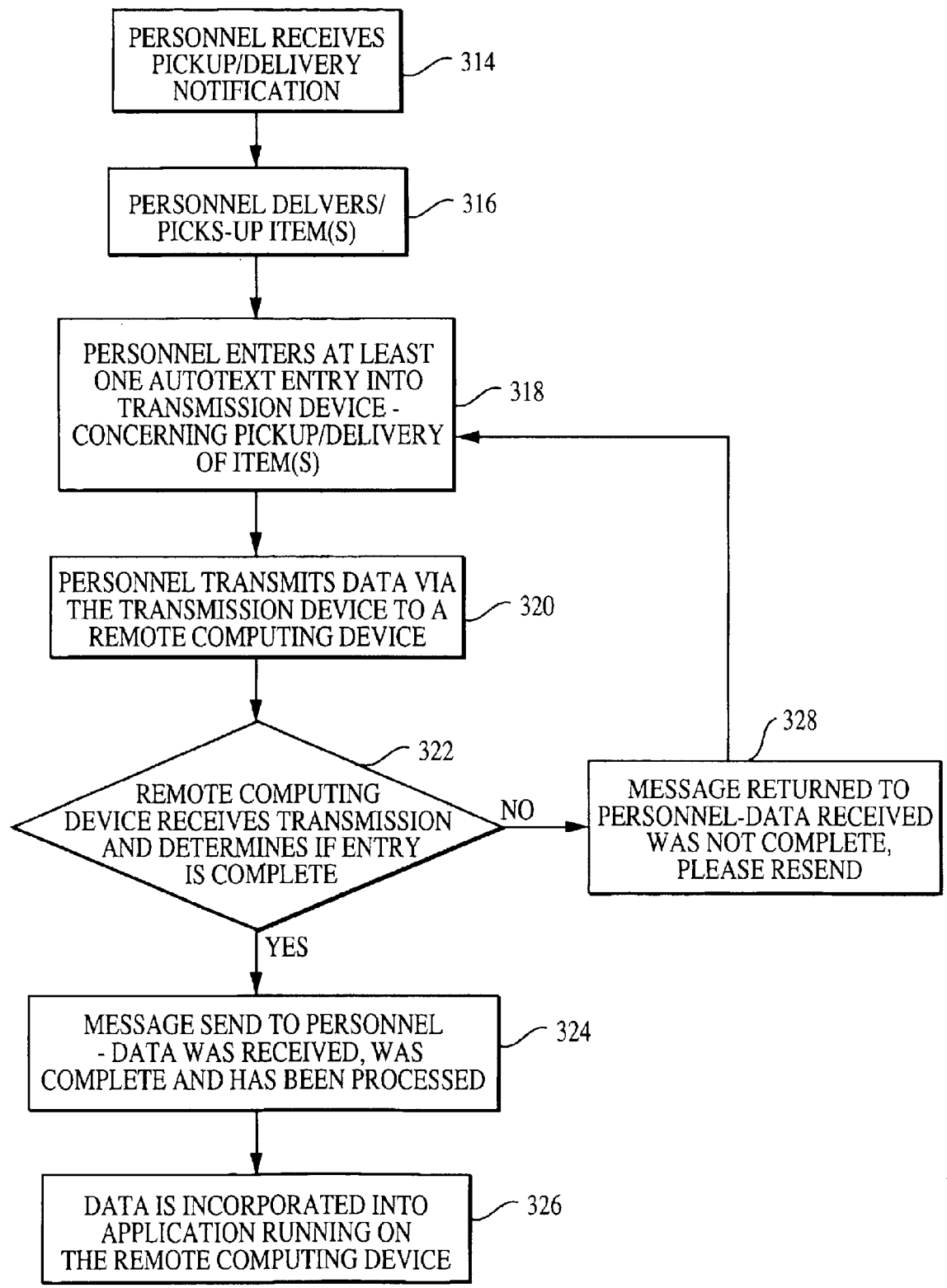
FIG. 7 is a table showing autotext tips for a particular transmission device.

FIG. 7 is a flow chart illustrating the process a driver carries out to report the delivery/pickup of an item(s). In step 314, the driver receives a request to either to pickup or to deliver items. The instructions may be received via the transmission device, phone, or on paper. The driver proceeds to make the delivery/pickup in step 316. After the pickup/delivery has been completed, the driver, in step 318, enters, using autotext, the data pertaining to the shipment into the transmission device. The driver transmits the data in step 320. In step 322, a remote computing device receives the transmission from the driver pertaining to the shipment and determines if the data is complete. If the data is complete, in step 324 the driver is notified via the transmission device that the data send has arrived and is complete. The data sent is then incorporated into an application running on the remote computing device in step 326. If the data was determined to be incomplete in step 322, the driver is notified, in step 328, that the data sent was received but not complete and is instructed to submit the necessary information.

Figure 8:
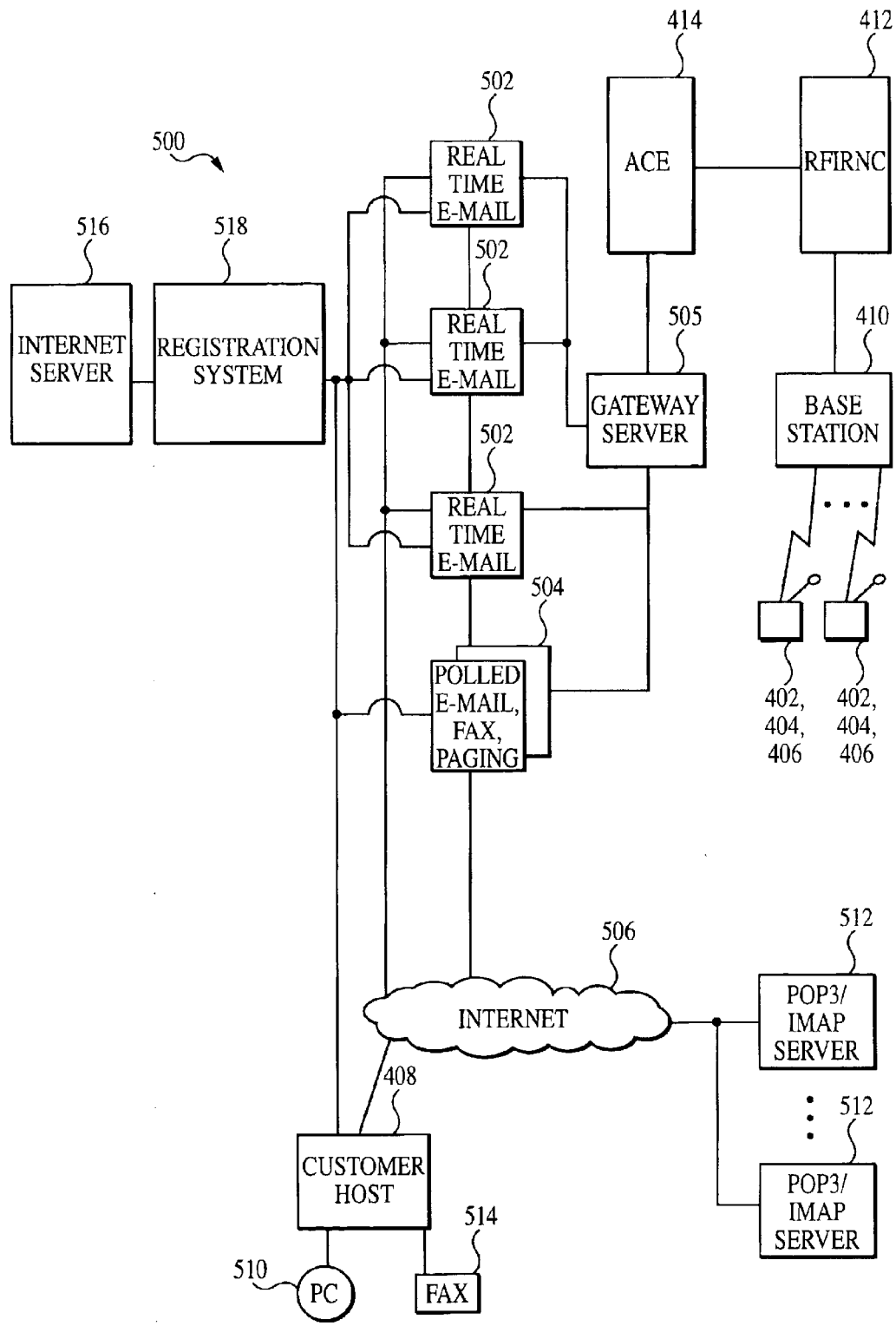
FIG. 8 is a simplified block diagram of the combined agent/messenger system.

FIGS. 8–11 describe additional advantages of the present invention. Referring now to FIG. 8, the combined agent/messenger gateway system 500 is shown. The wireless devices 402, 404, 406, the base station(s) 410, the RF/RNC(s) 412, the ARDIS® Connect Engine(s) (ACEs) 414, and the customer host(s) 408 are each as are included within FIG. 8. In addition, a plurality of messenger gateways 502 and agent gateways 504 are shown. In general, there can be one or more messenger gateways 502 and one or more agent gateways 504. The messenger 502 and agent 504 gateways are each connected, directly or optionally indirectly via, for example a gateway server 505, to an ACE 414. The gateways 502, 504 are also connected to a network 506 such as the Internet, and a registration system 518. The registration system 518 contains the required profile for each user, as will be explained in further detail herein, and is preferably connected to an Internet server, which allows users to optionally modify user information such as times at which they wish their wireless device 402, 404, 406 to retrieve messages from a server 512. One or more customer host computers 408 are connected to the Internet, and may optionally be connected to a messenger gateway 502. Finally, one or more e-mail servers 512 are connected to the Internet 506.

One optional difference between the messenger gateways 502 and the agent gateways 504 lies with the addressing scheme. The messenger gateways 502 (and wireless devices 402, 404, 406 associated therewith) operate with their own unique Internet domain name, comprised of at least an organization's or an individual's name combined with a top level domain name. Top level domain names can include: a) .com; b) .net; c) .org; d) .edu; e) .gov; f) .mil; and g) .int. Other top level domain names can also be used as they become available (e.g., .firm, .store, .arts, etc).

In a preferred embodiment, the domain name is @2way.net, although it will be readily recognized that domain names other than @2way.net can optionally be used. The end user has the option of what the <username> portion of the <username>@2way.net address will be, and can preferably change the <username> portion at any time in the registration system 518 via Internet server 516. The messenger gateways 502 thus preferably perform operations on messages having a domain name associated with the system 500 (e.g., in the case of the Motient[SM] network 400, an @2way.net domain name), whereas the agent gateways 504 preferably perform operations on messages having any domain name. Other methods of altering the functionality are also possible. For example, the functionality can be optionally distributed among the agent 504 and messenger 502 gateways as well.

The system 500 provides a wide variety of messaging services. For example, the messenger gateways 502 offer the power of two-way e-mail messaging, as well as optional facsimile (fax) and paging capabilities. Users can thus send messages to, for example, other wireless devices 402, 404, 406, to PC's 510 or similar devices via the Internet 506, as well as a text message to a fax machine 514. In a preferred embodiment, a wireless device such as a RIM™ 850 model wireless handheld device will be utilized, which can also receive and/or transmit pages via the network 500.

In a preferred embodiment, users who may use, for example, a POP and/or IMAP e-mail account(s) residing on, for example, a desktop/laptop PC 510 as their primary desktop e-mail are provided the convenience of utilizing a wireless device 402, 404, 406 to check their PC 510 account messages as will be discussed in further detail. The agent gateways 504 in conjunction with wireless devices 402, 404, 406 thus operate as an "extension" of, for example, a user's personal and/or corporate e-mail address/account. The agent gateways 504 preferably operate on a polled basis, checking, for example, a user's personal and/or corporate e-mail account when a user manually makes a request or automatically on a predetermined automatic basis (e.g., every 60 minutes).

Messaging Between Wireless Devices

The operation of the system 500 can be best described and illustrated by providing several examples. The system 500 can, for example, be used to send a message from one wireless device 402, 404, 406 to another wireless device 402, 404, 406. Although only two subscriber devices 402, 404, 406, are explicitly shown, any number consistent with network 500 capacity may be provided. The user inputs to his wireless device 402, 404, 406 the destination address of a second wireless device 402, 404, 406 to which he wishes to send a message. The message is then transmitted via a RF transmission to base station 410. Once received at a base station 410, the, message is preferably transmitted via a wireline network to a RF/RNC 412, and then preferably transmitted to an ACE 414. At this point, depending on what the recipient's address is, the message is then routed, via a gateway server 505, to either a messenger gateway 502 or an agent gateway 504. It should be understood, however, that the base stations 410, RF/RNCs 412 and ACEs 414 are not required, as such, to practice the invention. That is, any suitable transmission path and/or means for transmitting that enables the RF signals emitted by the wireless devices 402, 404, 406 to reach a messenger gateway 502 and/or agent gateway 504, or equivalents thereof, is all that is required.

In the case of peer-to-peer messaging (i.e., where the originator and recipient of the message both subscribe to a same network such as the Motient[SM] network 400), the message is advantageously routed to either a messenger gateway 502 or an agent gateway 504, without any substantial delay. Such a determination will generally be made by considering factors such as network traffic and loading of the respective gateways. Once received at either a messenger 502 or agent 504 gateway, the message is "turned around", without being routed through the Internet 506, and routed back through a gateway server 505, an ACE 414, an RF/RNC 412, a base station 410, and finally to a recipient wireless device 402, 404, 406.

Desktop to Wireless Device Messaging

Another type of message that can be transmitted by the system 500 is one that is initiated from a desktop e-mail system such as a PC 510, and destined for a wireless device 402, 404, 406. If the wireless device 402, 404, 406 has an @2way.net domain name, the message is routed over the Internet 508 to the wireless device 402, 404, 406 via a messenger gateway 502, gateway server 505, an ACE 414, a RF/RNC 412, and a base station 410. Optionally, direct connectivity of, for example, a customer host 408 to a messenger gateway 502 is possible. Here, the message is routed from the user's PC 510 via a customer host 408 to a messenger gateway 502, a gateway server 505, and then out through an ACE 414, a RF/RNC 412, and base station 410 for broadcasting to the wireless device 402, 404, 406. With either a standard transmission via a network such as the Internet 506 or via direct connectivity to a messenger gateway 502, the transmission path to a messenger gateway 502 is based on the fact that the message has been addressed to a predetermined address, e.g., <username>@2way.net address, which is the domain for the messenger gateways 502. Thus, in a preferred embodiment, an address originating from, say, a PC 510 and destined for a recipient having an e-mail address of the form <username>@2way.net address will be transmitted from the PC 510, through a messenger gateway 502, a gateway server 505, an ACE switch 414, a RF/RNC 412, a base station 410, and finally to the designated wireless device 402, 404, 406.

As previously noted, both the agent gateways 504 and the messenger gateways 502 advantageously have direct connection to the Internet 506. However, other embodiments in the present invention provide that the messenger gateways 502 and/or agent gateways 504 receive the messages from other modules or components in the system. For example, an agent gateway 504 may have direct connectivity to the Internet 506 and transfer messages to a messenger gateway 502, and/or vice versa.

Retrieving Messages from Another Account

Another example of a message transmission involves the use of a wireless device 402, 404, 406 to retrieve messages from, for example, a user's POP3 and/or IMAP 4 e-mail account residing on, say, a PC 510. Here, the wireless device 402, 404, 406 is preferably configured to poll the user's e-mail mailbox residing on, for example, a POP and/or IMAP server 512 at a fixed time or time interval (e.g., 5:00 P.M. and/or every 35 minutes). Alternatively, the wireless device can poll the user's server 512 when manually directed to so by the user by, for example, clicking a "Get Mail" icon. In either case, an agent gateway 504 can access the user's mailbox residing on a server 512 via a network such as the Internet 506, pull any message therein, and store them on an agent gateway 504. The messages can then routed via gateway server 505 to an ACE 414, a RF/RNC 412, a base station 410, and then to the user's wireless device 402, 404, 406 that has the address associate with that particular mailbox. This addressing and mapping of the user's wireless device 402, 404, 406 to the user's POP and/or IMAP e-mail account(s) is preferably done through the registration system 518, which contains the required profile for each user.

The agent gateways 504 thus merge a user's Internet 504 e-mail mailbox residing on a server 512 with the wireless device 402, 404, 406 to retrieve, either automatically on a predetermined basis or manually as directed by the user, mail from the user's POP and/or IMAP e-mail account(s).

The agent gateway 504 thus enables a user to utilize the same e-mail address as their POP and/or IMAP e-mail account. This also allows a user to, for example, respond to received e-mail messages from their wireless device 402, 404, 406 such that the messages look like they are being sent from the user's PC 510. In a preferred embodiment, any messages sent from a wireless device 402, 404, 406 are duplicated into a user's "Sent Mail" folder on server 512 when using the IMAP.

The system 500 allows users to have, for example, two e-mail accounts: one that utilizes a messenger gateway 502 to send and receive messages substantially immediately, and one that utilizes an agent gateway 504 for sending and receiving messages on a polled basis. The user can provide e-mail addresses associated with the respective accounts to various people, thereby providing enhanced flexibility as to how soon messages are received. Optionally, the agent gateways 504 and/or messenger gateways 502 allow a single user to hold two or more e-mail accounts (e.g., a work account and/or a personal account), and route e-mail from both either or both accounts to a single wireless device 402, 404, 406.

Having these two e-mail addresses allows a user, for example, to not be interrupted by messages coming through an agent gateway 504. This feature is provided by allowing the user to optionally and advantageously select when he wants to receive his messages. For example, the user can specify that he only wants to receive messages, for example, when he logs on and downloads them, or at a particular time (e.g., 5:00 P.M.). In such a case then, if the user is in a meeting at 2:00 P.M., he would then know that the message he has received is a message sent via a messenger gateway 502.

In a corporate setting, an employee who has a wireless device 402, 404, 406 and does not want, need, or currently have access to a corporate e-mail account can utilize the wireless device 402, 404, 406 in conjunction with his home e-mail system. Alternatively, employees who are away from the office may use a wireless device 402, 404, 406 to receive messages via a messenger gateway 502, particularly if they do not have either a home or work e-mail account from which they can retrieve their messages via an agent gateway 504.

Paging Service

The paging service operates in manner similar to the e-mail service. As previously noted, it is preferred that a wireless device such as a RIM™ 850 model be utilized, which can also receive and/or transmit pages via the network 500. Thus, depending on whether the user, via the registration system 518, sets the page up to utilize an agent gateway 504 or a messenger gateway 502, the user can receive pages on either a real time or polled basis. Specifically, if the user chooses via the registration system 518 to have page messages utilize a messenger gateway 502, the user will receive pages via the wireless device 402, 404, 406 on a real time basis. Similarly, if the user chooses via the registration system to have page messages utilize an agent gateway 504, the user will receive pages on a polled basis, as determined by the user.

In a preferred embodiment, a page intended for a wireless device 402, 404, 406 is generated from a standard numeric paging system such that when that message goes out to either the messenger gateway 502 or agent gateway 504, the page message looks like an e-mail message that is addressed to a wireless device 402, 404, 406 having an address of the form <username>@2way.net domain name. The text of the message will be the numbers that were keyed through the numeric paging system.

Facsimile Service Via Agent Gateway

Advantageously, the present invention, in accordance with one embodiment, enables a user to transmit a facsimile from a wireless device 402, 404, 406 to a facsimile device 514. By connecting the agent 504 and messenger 504 gateways together, a facsimile message can be transmitted from a wireless device 402, 404, 406 to a facsimile device 514 via a transmission path that includes a messenger gateway 502 (which does not have a faxing capability) and an agent gateway 504 (which does have a faxing capability). Previously, if an agent gateway 504 was not connected to a messenger gateway 502, a fax could not have been transmitted from a wireless device 402, 404, 406 via an agent gateway 502, since messenger gateways 502 do not have a faxing capability. From a functional standpoint, the capability of the agent gateways 504, which are polling gateways that include functionality that enable facsimile transmissions, are advantageously combined with the messenger gateways 502 used by wireless devices 402, 404, 406.

In operation, a wireless device 402, 404, 406, originates a facsimile message for a device 514. When a phone number for the facsimile device 514 is entered in the wireless device 402, 404, 406, the message is transmitted to a base station, an RF/RNC 412, an ACE 414, and subsequently to a messenger gateway 502. Since messenger gateways 502 do not have facsimile functionality, messenger gateways 502, which are operatively communicable with an agent gateway 504, transmit the facsimile message to an agent gateway 504. An agent gateway 504 then transmits the facsimile message to the facsimile device 514 via, for example the Internet 506. The facsimile transmission path can optionally include, for example, a customer host 408.

POP Service

Figure 9A:
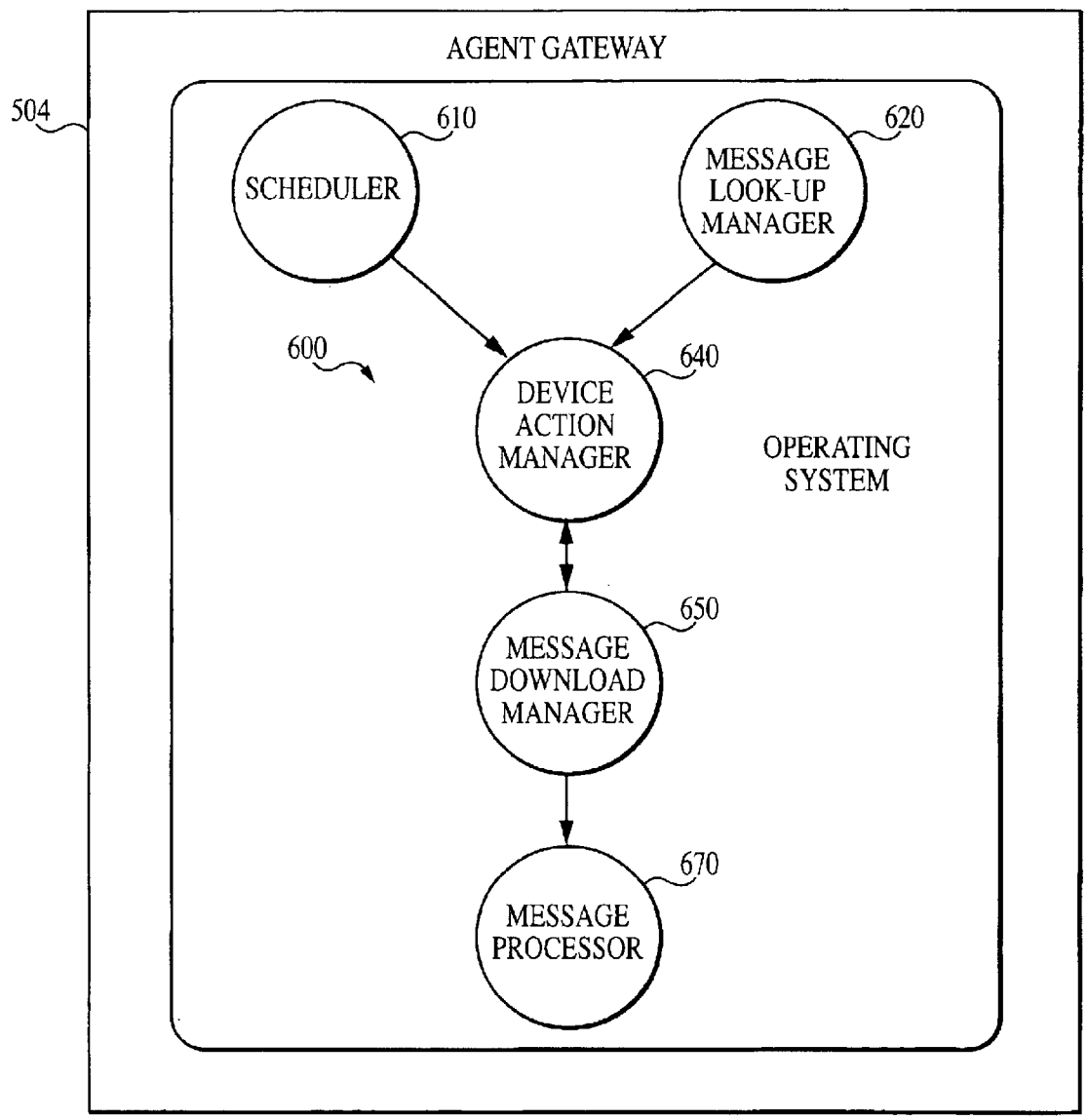
FIG. 9A is a simplified representation of the Post Office Protocol (POP) software architecture.

Turning now to FIG. 9A, a preferred high level embodiment of proxy server architecture 600, utilized in conjunction with the proxy server 505, is shown. The architecture 600 preferably works with at least POP and/or IMAP protocols. It should also be understood that the architecture 600 can accommodate both present and future version of the POP and IMAP protocols, as well as newly developed protocols used in transmitting and/or receiving e-mail and/or other wireless and/or electronic messages.

The scheduler 610 determines which, if any, of the wireless devices 402, 404, 406 are active. The scheduler 610 also, via the registration system 518, determines when each particular wireless device 402, 404, 406 registered with the system 500 is set to retrieve messages from an e-mail server 512. That is, the user may specify, via the registration system 518, that his messages be downloaded to his wireless device 402, 404, 406 on either a manual basis (e.g., a user specifically perform one or more commands to retrieve messages), or automatically on a predetermined basis (e.g., every 30 minutes). In the case of retrieving messages on a predetermined basis, the user optionally sets the time(s) at which he wishes his messages to be retrieved via the registration system 518. The user may change these settings at any time so that messages, for example, are retrieved at different times and/or time intervals, or retrieved manually.

In operation, the scheduler 610 notifies the download manager 620 via the device action manager 640 at the proper time for each wireless device 402, 404, 406. The scheduler 610 preferably accesses subscriber information to determine, for example, user specified download time(s) for each respective wireless device 402, 404, 406. Once the action for a particular user(s) is determined, the scheduler 610 notifies the device action manager 640.

The message lookup manager 620 is preferably optimized for downloading messages from a server 512 for worst case scenarios (e.g., 1000 messages in mailbox on server 512 with only one being a new message that needs to be downloaded). In a preferred embodiment, an identifier is associated with each user (e.g., a user ID), and a message identifier identifies each message (which is unique across various sessions for a given user) for each user that has been downloaded. The lookup manager 620 is also responsible for deleting records when corresponding messages are deleted from the user's mailbox storage on server 512.

In a preferred embodiment, the lookup manager 620 will access, for example, a message ID associated with each user message stored on an e-mail server 512. Each message ID associated with each user ID is unique. That is, the combination of the user ID and the message ID is preferably unique. Other unique identification systems or techniques may alternatively be used for the messages to be sent to specific individuals. Alternatively, or in combination, non-unique identifiers may be used. The lookup manager 620 accesses the message IDs associated with each message on an e-mail server 512, compares those IDs with the ID's of messages that have already been downloaded to the Proxy server 505, and downloads only those messages associated with message IDs that have not already been downloaded. In an alternative embodiment, when using IMAP, the lookup manager may simply access the last message ID downloaded and, in accordance with the IMAP, download from an e-mail server 512 those messages having a higher message ID number than the last message ID number downloaded. If desired, lower numbers can also be utilized to identify messages that have not been downloaded.

The message download manager 650 downloads new messages from servers 512 once new messages have been identified by the lookup manager 620. The download manager 650 waits for notifications from the scheduler 610 and the lookup manager 620.

The message processor 670 retrieves raw (i.e., messages in server 512 format such as POP or IMAP) messages, interprets the message format received from the server 512 mail format (e.g., POP, IMAP, etc.), and normalizes that message format to the Proxy server 505 message format, and stores the message(s) for subsequent processing. After storing the message, the gateway server 505 is notified to take action to transmit the message to the designated wireless device 402, 404, 406.

Figure 9B:
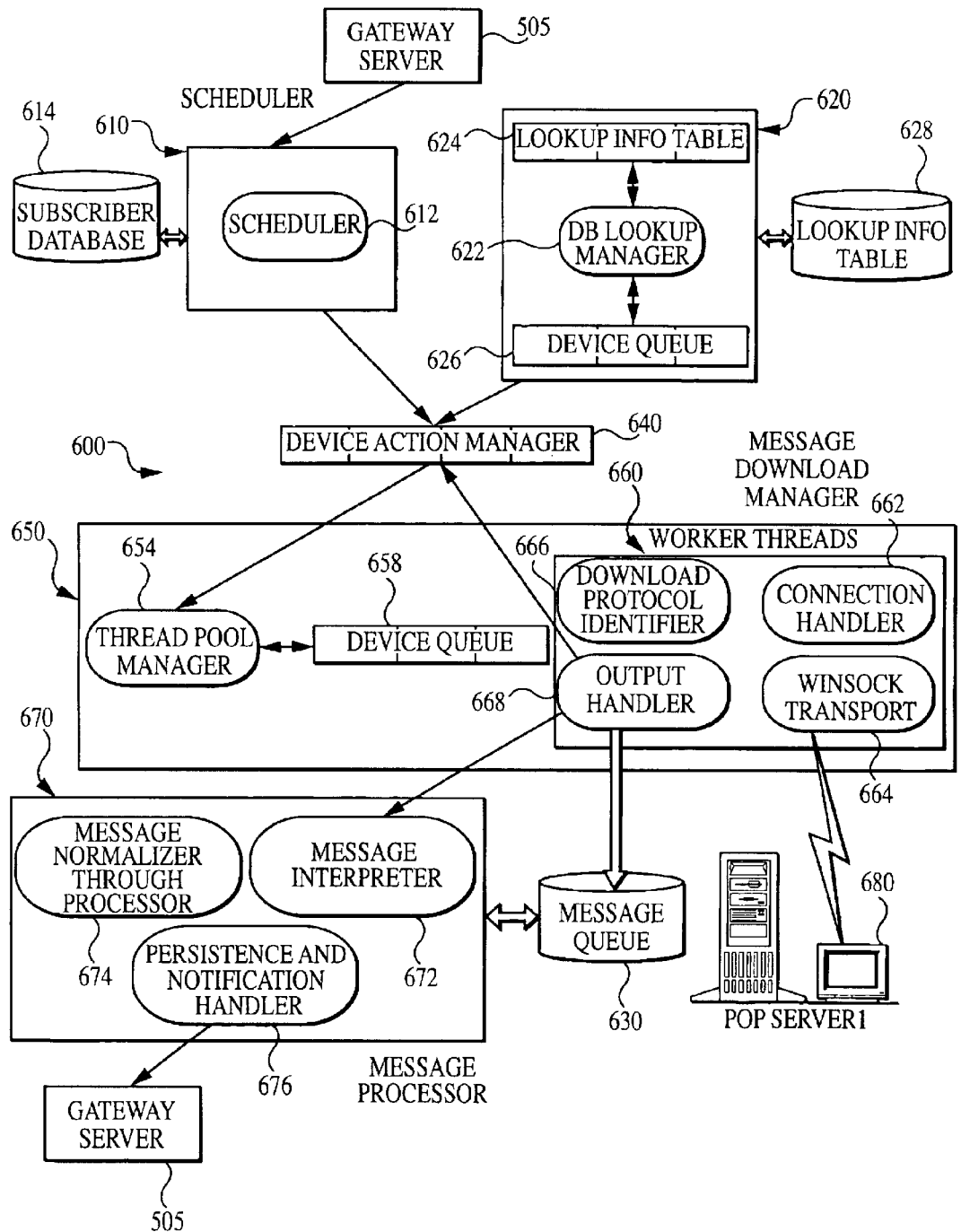
FIG. 9B is a detailed representation of the POP software architecture.

Turning now to FIG. 9B, a more detailed embodiment of the POP service architecture 600 is shown. Since the architecture 600 in accordance with the present invention potentially serves a large number of clients at any given time, there will generally be any number of servers 512. The servers 512 are preferably either POP and/or IMAP based servers, or other suitable hardware and/or protocol based system.

Since there may be a large number servers 512 and concurrent connections thereto, volume handling and scalability are important design criteria. Such volume handling and scalability are preferably addressed by providing a scheduler 610 that has a scheduling algorithm. The scheduler 610 determines which, if any, of the wireless devices 402, 404, 406 are active. Wireless devices 402, 404, 406 may be inactive for the obvious reason that they are not activated (e.g., turned off), or because they, for example, are in a designated coverage zone but cannot connect to the system 500 because of a building or other obstruction that prevents a RF signal of the wireless device from establishing contact with a base station 410. For wireless devices 402, 404, 406 to be active, they must be "connected" to the system 500 in the sense that they are able to send and/or receive messages thereto and/or therefrom.

As previously discussed, the scheduler 610 also, via the registration system 518, determines when each particular wireless device 402, 404, 406 registered with the system 500 is set to retrieve messages from an e-mail server 512. That is, the user may specify, via the registration system 518, that his messages be downloaded to his wireless device 402, 404, 406 on either a manual basis (e.g., a user specifically perform one or more commands to retrieve messages), and/or automatically on a predetermined or real time basis (e.g., every 30 minutes). In the case of retrieving messages on a predetermined basis, the user optionally sets the time(s) at which he wishes his messages to be retrieved via the registration system 518. The user may change these settings at any time so that messages, for example, are retrieved at different times and/or time intervals, or retrieved manually.

Wireless device 402, 404, 406 profiles are created and preferably maintained in a subscriber information database 614, which is preferably accessed by the registration system 518. The scheduler 610 is preferably based on subscriber configuration and activity contained in the subscriber information database 614. In addition to containing information pertaining to the user specified preferred delivery method (e.g., manual or predefined times), the subscriber information database 614 also preferably contains information pertaining to subscribers' POP and/or IMAP e-mail account such as: user name/identification, user password, user e-mail address, user display name, server name, etc. The subscriber profiles in the subscriber information database 614 are preferably accessible at least via the servers 512, the agent gateways 504, and the Internet 506.

In operation, the scheduler 610 notifies the download manager 620 via the device action manager 640 at the proper time for each wireless device 402, 404, 406. The scheduler 610 preferably accesses the subscriber information database 614 to determine the user specified download time(s) for each respective wireless device 402, 404, 406. Upon receiving such notification, the scheduler 610, preferably uses a scheduling algorithm and device activity and configuration information contained in subscriber database 614 to decide on the action that needs to be taken. Once the action is determined, the scheduler 610 notifies the device action manager 640.

The system 500, in a preferred embodiment, does not store messages permanently since virtually all POP and IMAP servers 512 provide storage for holding an unlimited number of messages for an unlimited period of time. The agent gateways 504 thus preferably store messages downloaded from a server 512 for a limited time period (e.g., 72 hours). When wireless devices 402, 404, 406 check for new mail on a server 512, any new messages on a server 512 must be differentiated from old messages (i.e., messages already downloaded to a wireless device 402, 404, 406), as the agent gateway 504 does not download all messages residing on a server 512, but only those that have not yet been downloaded. To solve this problem, the system 500 can to store and access some minimal "lookup" information about all messages on the servers 512.

As previously discussed, the message lookup manager 620 is therefore preferably optimized for performance for worst case scenarios (e.g., 1000 messages in mailbox on server 512 with only one being a new message that needs to be downloaded). The lookup information database 628 stores an identifier associated with each user (e.g., a user ID) and a message identifier that identifies each message (which is unique across various sessions for a given user) for each user that has been downloaded. Database 628 is generally useful across various sessions of the service, but within a given session, using database 628 would have an adverse impact on performance. Therefore, in a preferred embodiment, a minimal, just in time, in-memory lookup information table 624 is provided. The lookup manager 620 is also responsible for deleting records from the lookup table and in-memory data structures when corresponding messages are deleted from the user's mailbox storage on server 512.

In a preferred embodiment, the lookup manager 620 will access, for example, a message ID associated with each user message stored on an e-mail server 512. Each message ID associated with each user is unique. That is, the combination of the user ID and the message ID is unique. The lookup manager 620 accesses the message IDs associated with each message on an e-mail server 512, compares those IDs with the ID's of messages that have already been downloaded to the proxy server 505, and downloads only those messages associated with message IDs that have not already been downloaded. In an alternative embodiment, when using IMAP, the lookup manager may simply access the last message ID downloaded and, in accordance with the IMAP, download from an e-mail server 512 those messages having a higher message ID number than the last message ID number downloaded. If desired, lower numbers can also be utilized to number messages that have not been downloaded.

The database lookup manager 622 thus accesses, for example, a message ID or other unique message identifier associated with each stored message on a server 512, and compares these messages with the message IDs of messages already downloaded to the agent gateway 502, as provided by the lookup info table 624. In a preferred embodiment, database 628 stores in a fixed medium (e.g., a hard drive, CD-ROM, tape drive, and the like) the data contained in the lookup info table 624 in the event of a system 500 failure. The device queue 626, preferably resident in memory, maintains a list of wireless devices 402, 404, 406 for which action needs to be taken. For example, if ten wireless devices 402, 404, 406 have requested and/or are scheduled to check their messages on their respective servers 512 as determined by the scheduler 610, the database lookup manager 622 will access the device queue 626 to retrieve such information.

The message download manager 650 downloads new messages from servers 512 once new messages have been identified by the lookup manager 620. The download manager 650 waits for notifications from the scheduler 610 and the lookup manager 620. Once the input notifications are processed, the download manager 650 directs worker threads 660 as will be described herein.

Since the system 500 needs to connect to and communicate with various servers 512 in parallel, the preferred embodiment uses a multi-threaded approach. Hence, to create and optimally manage these threads a thread pool manager 654 is preferably used. Optionally, other implementations such as standard thread pool manager classes could equally be used. The thread pool manager 654 receives information from the device action manager 640, accesses the state of wireless device 402, 404, 406 from the device queue 658, and directs the worker threads 660 in downloading messages from a server 512 associated with the wireless device 402, 404, 406 under consideration in the device queue 658.

Regarding the worker threads 660, the Winsock (WINdows SOCKets) transport 664 is a standard application programming interface (API) between a Windows application and the TCP/IP protocol. Most TCP/IP stacks designed to run under Windows and most Windows software that communicates via TCP/IP is Winsock compliant. The Winsock routines are preferably implemented as a dynamic link library, and the WINSOCK.DLL file is included with the Windows operating system. The Winsock transport 664 is used to communicate between the download manager 650 and various servers 512.

The download protocol identifier 666 identifies which download protocol is used by the server (e.g., POP, IMAP, etc.). The connection handler 662 connects to a specific server 512 associated with the wireless device 402, 404, 406 currently in the device queue 658 and downloads any new message(s) identified by the message lookup manager 620, as previously described. The connection handler 662 also optionally identifies the type of connection to the server 512 (e.g., internet 506, dedicated line, virtual public network (VPN), etc.).

Messages downloaded from a server 512 are preferably stored in a raw message queue 630 via the output handler 668. The raw message queue is provided in a preferred embodiment since there will generally be differences between the processing speed of the download manager 650 and the message processor 670.

The message processor 670 retrieves messages (e.g., messages in server 512 format such as POP or IMAP) from the message queue 630, parses the messages, and creates a message object using the message interpreter 672. Once a message is retrieved from a given server 512, the message needs to be interpreted from the server 512 mail format (e.g., POP, IMAP, etc.), normalized to the Proxy server 505 message format, and stored in a database 630 for subsequent processing. The process of retrieving, normalizing, and storing a message will generally take longer than simply downloading the message. Therefore, the database 630 also serves as a raw message queue. The device action manager 640 maintains the state information of the message lookup manager 620 and user information associated with each wireless device 402, 404, 406 contained in the device queue 626.

Once the message is interpreted, it is normalized to the Proxy server 505 message format by the eLink$^{SM}$ message normalizer 674, and stored in a database 630. After storing the message, the agent gateway 504 can transmit the message to the designated wireless device 402, 404, 406, and the raw message queue manager 630 is notified to remove message from its queue, each by the persistence and notification handler 676.

Figure 10:
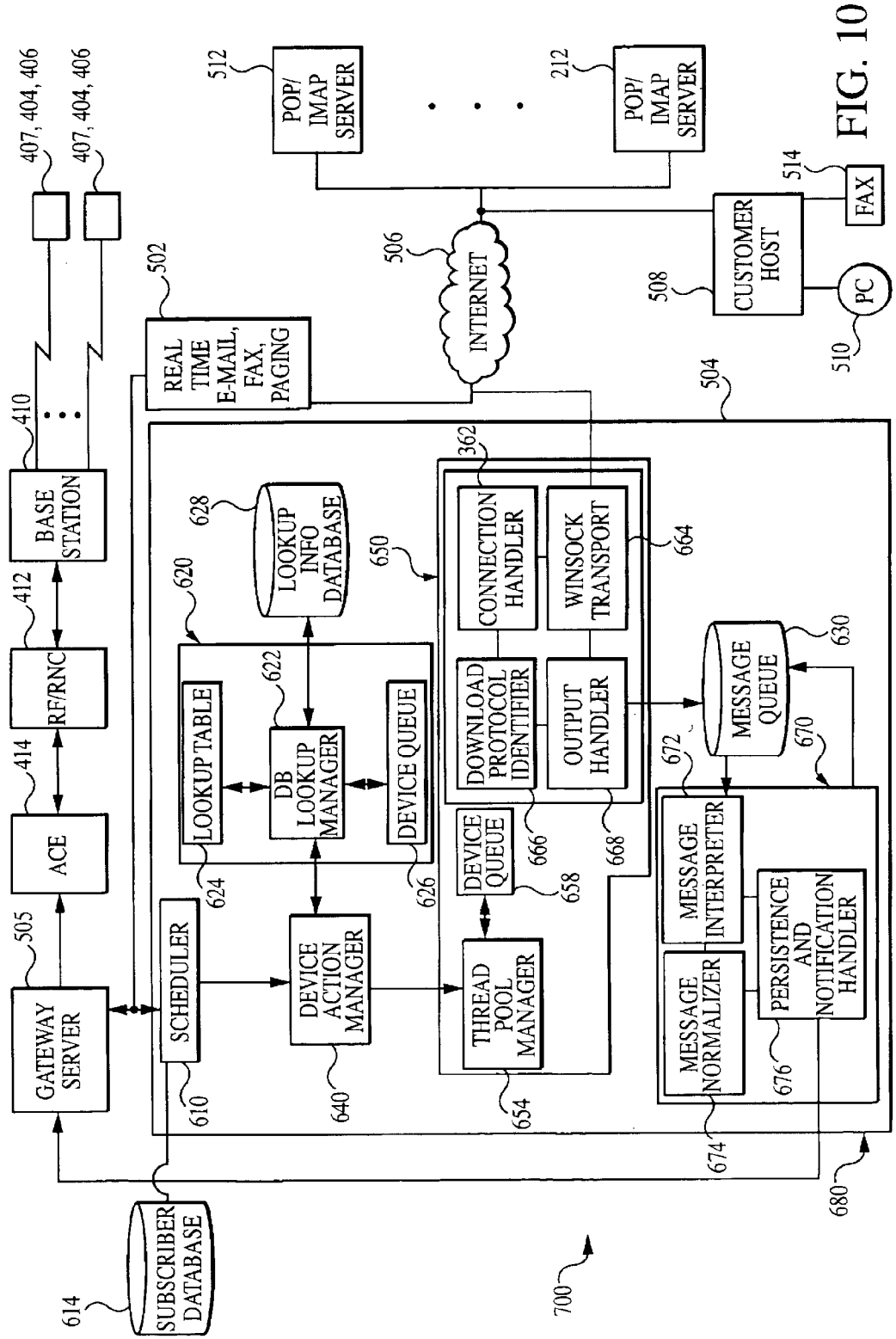
FIG. 10 is a block diagram of the combined agent/messenger system and POP software architecture.
Figure 11A:
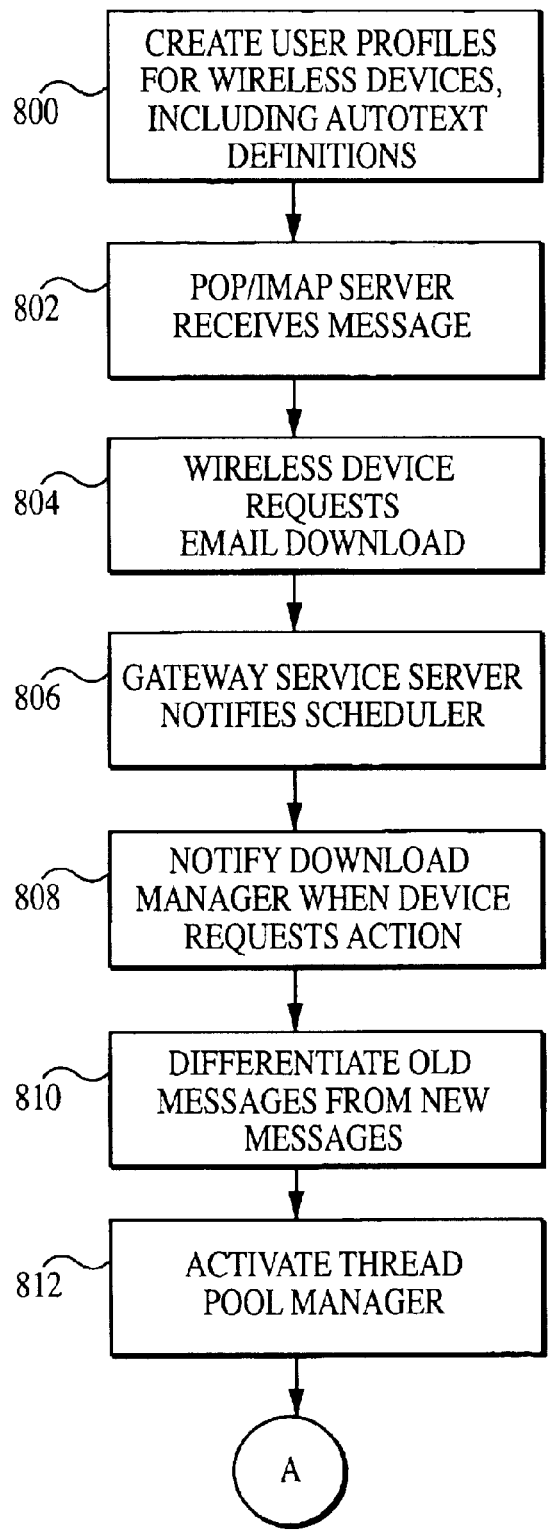
FIGS. 11A and 11B is a high level flow diagram of a preferred method in accordance with the invention.
Figure 11B:
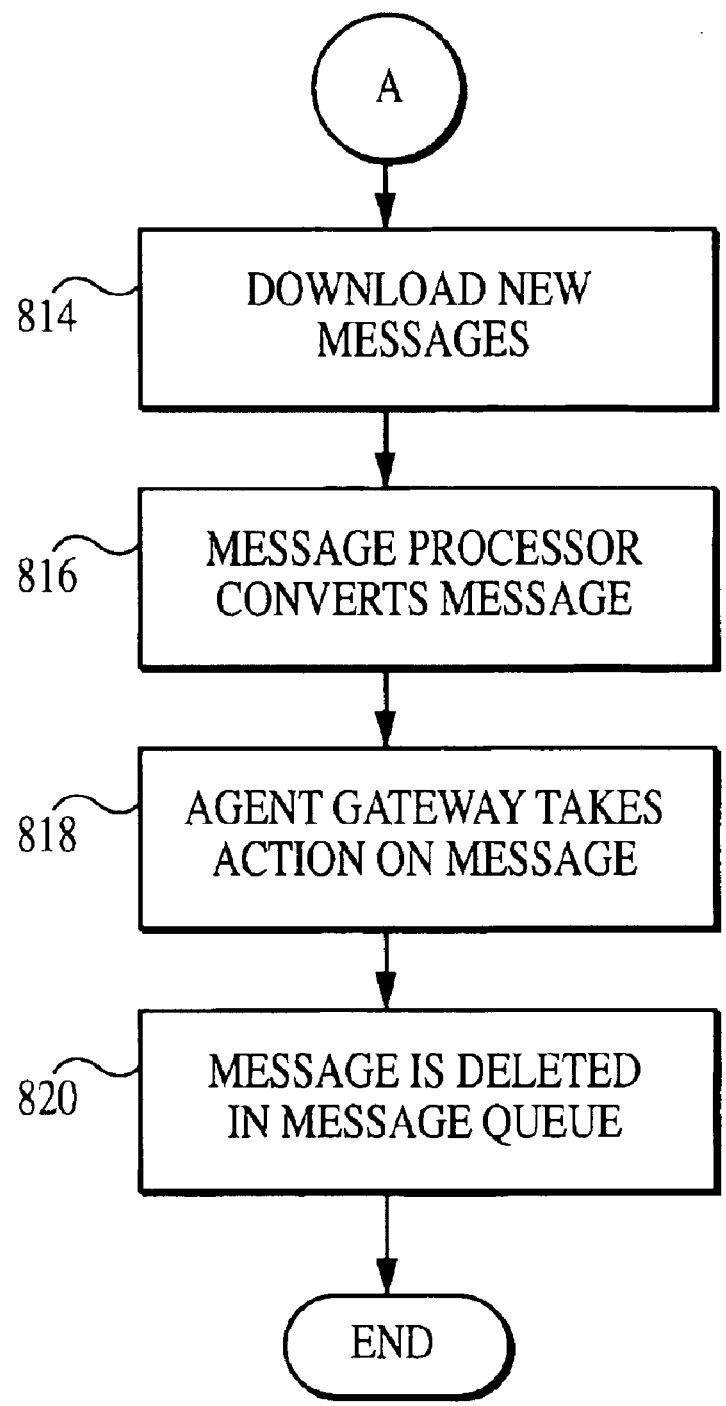

FIG. 10 shows an exemplary block diagram of the combination system 700. FIG. 10, which is similar to FIG. 11, shows the integrated architecture of the agent gateway 504. Specifically, the agent gateway 504 now shows the POP service architecture 600 as previously discussed with regard to FIGS. 9A and 9B. The integrated system 700 provides the functionality and advantages of real time and/or polled delivery of e-mail messages, faxing and paging as described heretofore.

FIG. 11 is a flow chart illustrating the steps performed by the combination system 700 when a user uses a wireless device 402, 404, 406 to retrieve messages from a server 512. In step 800, wireless device 402, 404, 406 profiles are created and maintained in a subscriber database 614. The profiles include predefined autotext entries. The subscriber database 614 preferably contains information pertaining to the subscribers' POP and/or IMAP e-mail account(s) such as: user name/identification, user password, user e-mail address, user display name, server name, etc.

In step 802, one or more e-mail servers 512 receive one or more messages. The messages can be associated with one or more user's, where each user can have one or more e-mail accounts. As previously discussed, the messages stored on server 512 are preferably of a POP and/or IMAP format. In step 804, when a wireless device 402, 404, 406 is programmed or manually directed to retrieve messages stored on server 512, the agent gateway 504 is contacted via a base station 410, a RF/RNC 412, an ACE 414, and a gateway server as shown in FIG. 6. Alternatively, server 512 may transmit/broadcast messages directly or without the wireless device specifically requesting.

In step 806, the scheduler 610 stores the identification of each wireless device 402, 404, 406 that has requested a download in the device action manager 640. In step 808, the device action manager notifies the message download manager when each wireless device 402, 404, 406 has requested action.

In step 810, the thread pool manager 654 within the message download manager 650 is activated. As previously discussed, the thread pool manager 654 receives information from the device action manager 640, accesses the state of wireless device 402, 404, 406 from the device queue 658, and directs the worker threads 660 in downloading messages from a server 512 associated with the wireless device 402, 404, 406 under consideration in the device queue 658.

In step 812, the download manager 650, as previously discussed, utilizes the message lookup manager 620 to differentiate between any messages on a server 512 that have not been downloaded to an agent gateway 504. In step 814, the message download manager 650 downloads any new messages from a POP and/or IMAP server 512. While the message download manager 650 retrieves the computer messages from a server 512, the agent gateway 504 may continue to receive additional requests from other wireless devices 402, 404, 406 via the scheduler 610. In a preferred embodiment, user messages stored on server 512 are preferably identified, for example, by a message ID and/or a destination address of the computer messages, such as the user's e-mail addresses. As previously discussed, the user's account information may also include such information as a password associated with the user's account. The account information will also include when the wireless device wishes to receive messages (e.g., 9:00 AM and 5:00 PM).

Next, in step 816 the message processor 670 interprets (e.g., converts, formats, etc.) via the message interpreter 672 the message received from a POP/IMAP server to the agent gateway 504 message format. In step 818, an agent gateway 504 is notified to take action on this message by the persistence and notification handler 676. Finally, in step 820, the message in the raw message queue 630 is deleted by the persistence and notification handler 676.

An alternative network configuration is illustrated in U.S. Pat. No. 6,219,694 incorporated herein by reference.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. A wireless communications system for use in the transportation industry, comprising:

at least one data transmission device comprising a wireless messaging device having a first identifier associated with said at least one network, and including a user interface providing a user functionality to enter into said at least one data transmission device at least one predefined data field and data associated with the at least one predefined data field, the at least one predefined data field and the data associated therewith formatted in accordance with a standard format including at least one first standard format for the at least one predefined data field and at least one second standard format for the data, and the data including at least one of economic and logistical data relating to at least one of shipment, delivery and receipt of shipped goods;

at least one remote computing device, operatively connectable to said at least one data transmission device, said at least one remote computing device comprising an e-mail server storing messages for at least one e-mail account, each e-mail account having a second identifier associated therewith, wherein the at least one data transmission device and the at least one remote computing device transmit signals to each other via said networks in accordance with predetermined criteria including respective identifiers associated with each of the at least one data transmission device and the at least one remote computing device, and receiving each of the at least one predefined data field and the data transmitted by said at least one data transmission device, and processing the at least one first standard format for the at least one predefined data field and the at least one second standard format for the data responsive to the standard format using at least one application program stored on said at least one remote computing device configured to receive the standard format comprising the at least one first standard format for the at least one predefined data field and the at least one second standard format for the data; and at least one network operatively connectable to each of said at least one data transmission device and each of said at least one remote computing device, and transmitting the at least one first standard format for the at least one predefined data field and the at least one second standard format for the data responsive to the standard format to said at least one remote computing device and receiving the at least one first standard format for the at least one predefined data field and the at least one second standard format for the data responsive to the standard format from said at least one data transmission device.

2. The wireless communications system as recited in claim 1, wherein each standard format comprises a bill of lading, a weight, a shipper zip, a consignee zip, a number of pieces slipped, a delivery date, a name of an individual who signed a delivery receipt, a product number, an indication that the goods are delivered, an indication that the goods are picked up, an estimated time of arrival, a comment, an indication that a trailer is being dropped off, an indication that a trailer is being picked up, a drop/hook indication, and an indication that the goods are at least one of over, short and damaged.

3. The wireless communications system an recited in claim 1, wherein each of the at least one predefined data field comprises a user-entered pre-defined representation corresponding to at least one of a word and phrase and facilitates utilization of at least a portion of the transmitted data with at least one of the data file and the data file format associated with at least application program residing on said at least one remote computing device.

4. The wireless communications system as recited in claim 3, wherein each of the at least one predefined data field comprises a user-entered pre-defined representation corresponding to at least one of a word and phrase comprising a bill of lading, a weight, a shipper zip, a consignee zip, a number of pieces shipped, a delivery date, a name of an individual who signed a delivery receipt, a product number, an indication that the goods are delivered, an indication that the goods are picked up, an estimated time of arrival, a comment, an indication that a trailer is being dropped off, an indication that a trailer is being picked up, a drop/hook indication, and an indication that the goods are over, short or damaged.

5. The wireless communications system as recited in claim 1, wherein each of the at least one data transmission device is a portable device.

6. The wireless communications system as recited in claim 1, wherein each of the at least one data transmission device verifies that the user has entered a valid predefined data field prior to transmission.

7. The wireless communications system as recited in claim 1, wherein each of the at least one remote computing device verifies that a valid data field has been received prior to utilizing the transmitted data.

8. The wireless communications system as recited in claim 1, wherein each of the at least one networks comprise:
   a scheduler determining which of the at least one data transmission devices are active;
   a device action manager receiving notification from said scheduler and monitoring which of said at least one transmission devices have requested to download a message from the at least one remote computing device;
   a download manager receiving notification via said scheduler at which time messages associated with each of the at least one data transmission device are to be downloaded;
   a message lookup manager determining an identifier associated with each message associated with each of the at least one transmission device and selecting those messages that have not been downloaded from the at least one remote computing device to the respective first communications device; and
   a message processor for retrieving messages from the remote computing device and transmitting the messages to the respective data transmission device as determined by a selection system.

9. The system according to claim 1, wherein said signals comprise at least one of an electronic mail message, an electronic page, and a paging message.

10. The system according to claim 8 wherein said download manager downloads messages subsequent to receiving an indication from said scheduler and said lookup manager.

11. The system according to claim 8 wherein said message processor converts the message format of the at least one second communications device to a message format of the at least one data transmission device.

12. The system according to claim 8 wherein said lookup manager deletes a message record when a corresponding message is transmitted to the at least one data transmission device.

13. The system according to claim 8 wherein said scheduler further determines the time at which each of the at least one data transmission devices are to receive a message.

14. The system according to claim 1 wherein each of said at least one data transmission device have a common domain name associated therewith.

15. The system according to claim 8, wherein said scheduler accesses subscriber information from the selection system to determine user specified download times.

16. A method for standardizing data communications, pertaining to economic and/or logistical data relating to the shipment, delivery and/or receipt of goods, between at least one data transmission device and at least one remote computing device, comprising the steps of:
   a) entering into at least one data transmission device a predefined data field and associated data, wherein the predefined data field and the associated data comprise a standard format and the at least one data transmission device is a wireless messaging device having a first identifier associated with at least one network;
   b) transmitting the predefined data field said the associated data to at least one remote computing device comprising an e-mail server storing messages for at least one e-mail account in accordance with predetermined criteria, the predetermined criteria comprising respective identifiers associated with each of the at least one data transmission device and the at least one remote computing device;
   c) associating a second identifier with each e-mail account;
   d) receiving by the at least one remote computing device the redefined data field and associated data; and
   e) utilizing at least a portion of the data received in step d) with at least one of a data file and a data format associated with at least one application program residing on the at least one remote computing device.

17. The method according to claim 16, wherein each of the at least one predefined data field comprises a user-entered pre-defined representation corresponding to a word or phrase pertaining to at least one of a bill of lading, a weight, a shipper zip, a consignee zip, a number of pieces shipped, a delivery date, a name of an individual who signed a delivery receipt, a product number, an indication that the goods are delivered, an indication that the goods are picked up, an estimated time of arrival, a comment, an indication that a trailer is being dropped off, an indication that a trailer is being picked up, a drop/hook indication, and an indication that the goods are over, short or damaged.

18. The method according to claim 16, wherein each of the at least one remote computing device verifies that a valid data field has been received prior to utilizing the transmitted data.

19. The method according to claim 16, wherein each of the at least one data transmission device is a portable device.

20. The method according to claim 16, wherein each of the at least one data transmission device verifies that the user has entered a valid predefined data field prior to transmission.

21. The method according to claim 16, further comprising the steps of:
   determining which of the at least one data transmission devices are active;
   receiving notification and monitoring which of said at least one transmission devices have requested to download a message from the at least one remote computing device;
   receiving notification at which time messages associated with each of the at least one data transmission device are to be downloaded;

determining an identifier associated with each message associated with each of the at least one transmission device and selecting those messages that have not been downloaded from the at least one remote computing device to the respective first communications device; and retrieving messages from the remote computing device and transmitting the messages to the respective data transmission device.

* * * * *

UNITED STATES PATENT AND TRADEMARK OFFICE
CERTIFICATE OF CORRECTION

| | |
|---|---|
| PATENT NO. | : 6,938,099 B2 |
| APPLICATION NO. | : 09/917937 |
| DATED | : August 30, 2005 |
| INVENTOR(S) | : Morton et al. |

It is certified that error appears in the above-identified patent and that said Letters Patent is hereby corrected as shown below:

Column 14, line 44, "Delivery Message Example" should read -- <u>Delivery Message Example</u> --

Column 15, line 10, "Pickup Message Example" should read -- <u>Pickup Message Example</u> --

Column 17, line 33, "Messaging Between Wireless Devices" should read -- <u>Messaging Between Wireless Devices</u> --

Column 18, line 3, "Desktop to Wireless Device Messaging" should read -- <u>Desktop to Wireless Device Messaging</u> --

Column 18, line 40, "Retrieving Messages from Another Account" should read -- <u>Retrieving Messages from Another Account</u> --

Column 19, line 43, "Paging Service" should read -- <u>Paging Service</u> --

Column 20, line 1, "Facsimile Service Via Agent Gateway" should read -- <u>Facsimile Service Via Agent Gateway</u> --

Column 20, line 32, "POP Service" should read -- <u>POP Service</u> --

Column 26, line 56, "slipped" should read -- shipped --

Column 26, line 64, "an" should read -- as --

Column 28, line 18, "said" should read -- and --

Column 28, line 29, "redefined" should read -- predefined --

Signed and Sealed this
Thirtieth Day of October, 2012

David J. Kappos
*Director of the United States Patent and Trademark Office*